(12) United States Patent  
Heffner

(10) Patent No.: US 8,995,658 B2
(45) Date of Patent: Mar. 31, 2015

(54) PHYSICS-BASED KEY GENERATION

(71) Applicant: Honeywell International Inc., Morristown, NJ (US)

(72) Inventor: Kenneth Henry Heffner, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 54 days.

(21) Appl. No.: 13/766,201

(22) Filed: Feb. 13, 2013

(65) Prior Publication Data

US 2014/0226813 A1 Aug. 14, 2014

(51) Int. Cl.
H04L 29/06 (2006.01)
H04L 9/08 (2006.01)
H04L 9/22 (2006.01)
H04L 9/30 (2006.01)
H04L 9/12 (2006.01)

(52) U.S. Cl.
CPC .. H04L 9/08 (2013.01); H04L 9/22 (2013.01); H04L 9/30 (2013.01); H04L 9/0866 (2013.01); H04L 9/0872 (2013.01); H04L 9/12 (2013.01)
USPC .......................................................... 380/44

(58) Field of Classification Search
CPC ................. H04L 9/08; H04L 9/22; H04L 9/30
USPC .......................................................... 380/44
See application file for complete search history.

(56) References Cited

U.S. PATENT DOCUMENTS

| 6,893,877 | B2 | 5/2005 | Hunter et al. |
| 7,082,539 | B1 * | 7/2006 | Kitahara et al. ............. 713/189 |
| 7,195,872 | B2 | 3/2007 | Agrawal et al. |
| 7,246,240 | B2 | 7/2007 | Chuang et al. |
| 7,316,899 | B2 | 1/2008 | McDevitt et al. |
| 7,539,308 | B2 | 5/2009 | Conti et al. |
| 7,840,803 | B2 | 11/2010 | Clarke et al. |
| 8,264,689 | B1 | 9/2012 | Azzazy et al. |
| 8,379,856 | B2 | 2/2013 | Potkonjak |

(Continued)

FOREIGN PATENT DOCUMENTS

| WO | 2006/074153 A2 | 7/2006 |
| WO | 2007011865 A2 | 1/2007 |

OTHER PUBLICATIONS

McGuyer, "Atomic Physics With Vapor-Cell Clocks," a dissertation presented to the faculty of Princeton University, Jun. 2012, 195 pp.

(Continued)

Primary Examiner — Hadi Armouche
Assistant Examiner — Shahriar Zarrineh
(74) Attorney, Agent, or Firm — Shumaker & Sieffert, P.A.

(57) ABSTRACT

In some examples, a controller is configured to generate a key based on a physics-based output of a component. The controller may, for example, use the key to authenticate communication between at least two nodes, to encrypt data, or to decrypt data, may be generated based on a physics-based output generated a component. The output generated by the component may vary over time, such that the controller is configured to generate a different key, depending on the time at which the output from the component used to generate the key was generated by the component. In some examples, the key is not stored in a memory, and is a discrete signal that only exists in real-time while the component is active and generating the detectable output.

20 Claims, 5 Drawing Sheets

(56) References Cited

U.S. PATENT DOCUMENTS

| | | | |
|---|---|---|---|
| 2002/0197622 | A1 | 12/2002 | McDevitt et al. |
| 2003/0163711 | A1* | 8/2003 | Grawrock ............... 713/189 |
| 2005/0118960 | A1* | 6/2005 | Miyazaki ............... 455/67.11 |
| 2006/0018476 | A1 | 1/2006 | Nickel |
| 2006/0271793 | A1* | 11/2006 | Devadas et al. ............... 713/189 |
| 2007/0262847 | A1* | 11/2007 | Grabinger et al. ............. 340/3.1 |
| 2008/0019514 | A1* | 1/2008 | Stromberg et al. ............. 380/46 |
| 2010/0067685 | A1 | 3/2010 | Okita |
| 2010/0199092 | A1* | 8/2010 | Andrus et al. ............... 713/171 |
| 2012/0178335 | A1 | 7/2012 | Eden et al. |
| 2012/0285198 | A1 | 11/2012 | Shang |
| 2013/0009214 | A1 | 1/2013 | Bustillo et al. |

OTHER PUBLICATIONS

Frikken et al., "Robust Authentication Using Physically Unclonable Functions," ISC 2009, Sep. 7-9, 2009, Lecture Notes in Computer Science (LNCS), vol. 5735, pp. 262-277.

Rosenfeld et al., "Sensor Physical Unclonable Functions," 2010 IEEE International Symposium on Hardware Oriented Security and Trust (HOST), Jun. 13-14, 2010, 6 pp.

Kitching et al., "Miniature vapor-cell atomic-frequency references," 2002 American Institute of Physics, Applied Physics Letters, vol. 81, No. 3, Jul. 15, 2002, pp. 553-555.

Pappu, et al., "Physical One-Way Functions", Science, vol. 297, No. 5589, Sep. 20, 2002, pp. 2026-2030.

Gassend, et al., "Silicon Physical Random Functions", Computer Science and Artificial Intelligence Laboratory, Massachusetts Institute of Technology, in the Proceedings of the Computer and Communication Security Conference, Washington, DC, USA, 14 pages, Nov. 2002.

Beckmann, et al., "Hardware-Based Public-Key Cryptography with Public Physically Unclonable Functions", S. Katzenbeisser and A.R. Sadeghi (Eds.): IH 2009, LNCS 5806, 2009, pp. 206-220.

Guajardo, et al., "Philips FPGA Intrinsic PUFs and Their Use in IP Protection", 22 pages, CHES 2007, Sep. 11, 2007.

Meguerdichian, et al., "Matched Public PUF: Ultra Low Energy Security Platform", IEEE/ACM International Symposium on Low Power Electronics and Design, pp. 45-50, Aug. 2011.

Konig, et al., "Locking of Accessible Information and Implications for the Security of Quantum Crytography," Phys. Rev. Letters 98, 5 pages, Jan. 2006.

Ralph, "Quantum Optical Systems for the Implementation of Quantum Information Processing," Centre for Quantum Computer Technology, Department of Physics, University of Queensland, St. Lucia 4072, Australia, 29 pages, Feb. 1, 2008.

Weier, "Experimental Quantum Cryptography," Physik-Department, 91 pages, Dec. 12, 2003.

Meguerdichian et al., "Security Primitives and Protocols for Ultra Low Power Sensor Systems," Sensors, IEEE, 4 pages, Oct. 28-31, 2011.

Meguerdichian et al., "Matched Public PUF: Ultra Low Energy Security Platform," International Symposium on Low Power Electronics and Design, 6 pages, Aug. 1-3, 2011.

Nabeel et al., "Authentication and Key Management for Advanced Metering Infrastructures Utilizing Physically Unclonable Functions," IEEE SmartGridComm 2012 Symposium—Cyber Security and Privacy, 6 pages, Nov. 2012.

\* cited by examiner

PHYSICS-BASED KEY GENERATION

TECHNICAL FIELD

This disclosure relates to secure communication.

BACKGROUND

In some cases, it may be desirable for communications between two or more nodes (e.g., two devices at the same location or separate locations) to be secure, e.g., in order to help prevent eavesdropping by a third party, interception of information being communicated between the nodes by a third party, or corruption of the information being communicated between the nodes.

SUMMARY

In some aspects, the disclosure describes example devices, systems, and techniques for securing communication between at least two nodes. The nodes may be, for example, devices (e.g., computing devices) of a network that are in the same location or at different locations, elements of a common device, or any other entities that may communicate with each other to, for example, exchange information or to relay information between other entities. In some examples, a component (e.g., an emitter, sensor, sensor array, or semiconductor device) of a node is configured to generate a detectable output (e.g., a particle or waveform) that is based on a physical configuration of the component (e.g., the physical characteristics of the component). This output may be referred to as a physics-based output, and, in some examples, may be incidentally generated by the component, e.g., statically generated or generated in response to a stimulus applied to the component. In some examples, the detectable output of a component may be modified by changing the physical characteristics of the component or an input (e.g., a stimulus) applied to the component to generate the output. A key, e.g., an authentication key, an encryption key for encrypting data, a decryption key for decrypting data, or any combination thereof, may be generated based on the detectable output of the component.

In some examples, a network includes at least two nodes that are configured to communicate with each other. The nodes may be separate platforms (e.g., pieces of equipment) or may be a part of the same platform. Each of the nodes of the network includes a component that is configured to generate a detectable physics-based output. Each node is configured to generate a key (also referred to herein as a "physics-based key") based on the detectable output. In some examples, a first node of the network may be configured to generate and transmit the key to a second node of the network; the second node may then authenticate the first node based on the received key or authenticate a communication from the first node based on the received key. In addition or instead, the first node may be configured to encrypt data using the key and the second node may be configured to decrypt data using a respective key generated based on the output of the respective component.

The components of the first and second nodes are configured to generate the same authentication key when the keys are generated from the outputs of the components generated at substantially the same time. For example, the first and second nodes may each include components that are modified to behave similarly and the components may be timed with each other, such that the components generate substantially similar (e.g., identical or nearly identical) outputs at substantially similar times. In addition, or instead, different inputs may be applied to the components of the first and second nodes to generate the substantially similar outputs at substantially similar times. In this way, the first node may authenticate the second node by comparing the physics-based key transmitted by the second node with the key generated by the first node.

In one example, the disclosure is directed to a method comprising receiving a first output generated by a component at a first time, wherein the first output based on a physical configuration of the component, generating, with a controller, a key based on the first output, receiving a second output generated by the component at a second time, wherein the second output is based on the physical configuration of the component and is different than the first output, and generating, with the controller, a second key based on the second output, wherein the second key is different than the first key.

In another example, the disclosure is directed to a system comprising a component configured to generate an output, wherein the output is based on a physical configuration of the component, and wherein the output varies over time, and a controller configured to generate a key based on the output.

In another example, the disclosure is directed to a system comprising means for generating an output that varies over time, wherein the output is based on a physical configuration of the means for generating the output, and means for generating a key based on the output.

In another example, the disclosure is directed to a method comprising modifying a first output generated by a first component of a first node to substantially match a second output generated by a second component of a second node, wherein the first output is based on a physical configuration of the first component and the second output is based on a physical configuration of the second component, and synchronizing a first clock of the first node and a second clock of the second node such that the first and second nodes are configured to generate time-matched keys based on the first and second outputs, respectively.

In another example, the disclosure is directed to an article of manufacture comprising a computer-readable storage medium. The computer-readable storage medium comprises computer-readable instructions for execution by a processor. The instructions cause a programmable processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a programmable processor to perform the techniques described herein. The computer-readable medium may be non-transitory.

The details of one or more examples are set forth in the accompanying drawings and the description below. Other features, objects, and advantages in addition to those described below will be apparent from the description and drawings, and from the claims.

DETAILED DESCRIPTION

Figure 1:
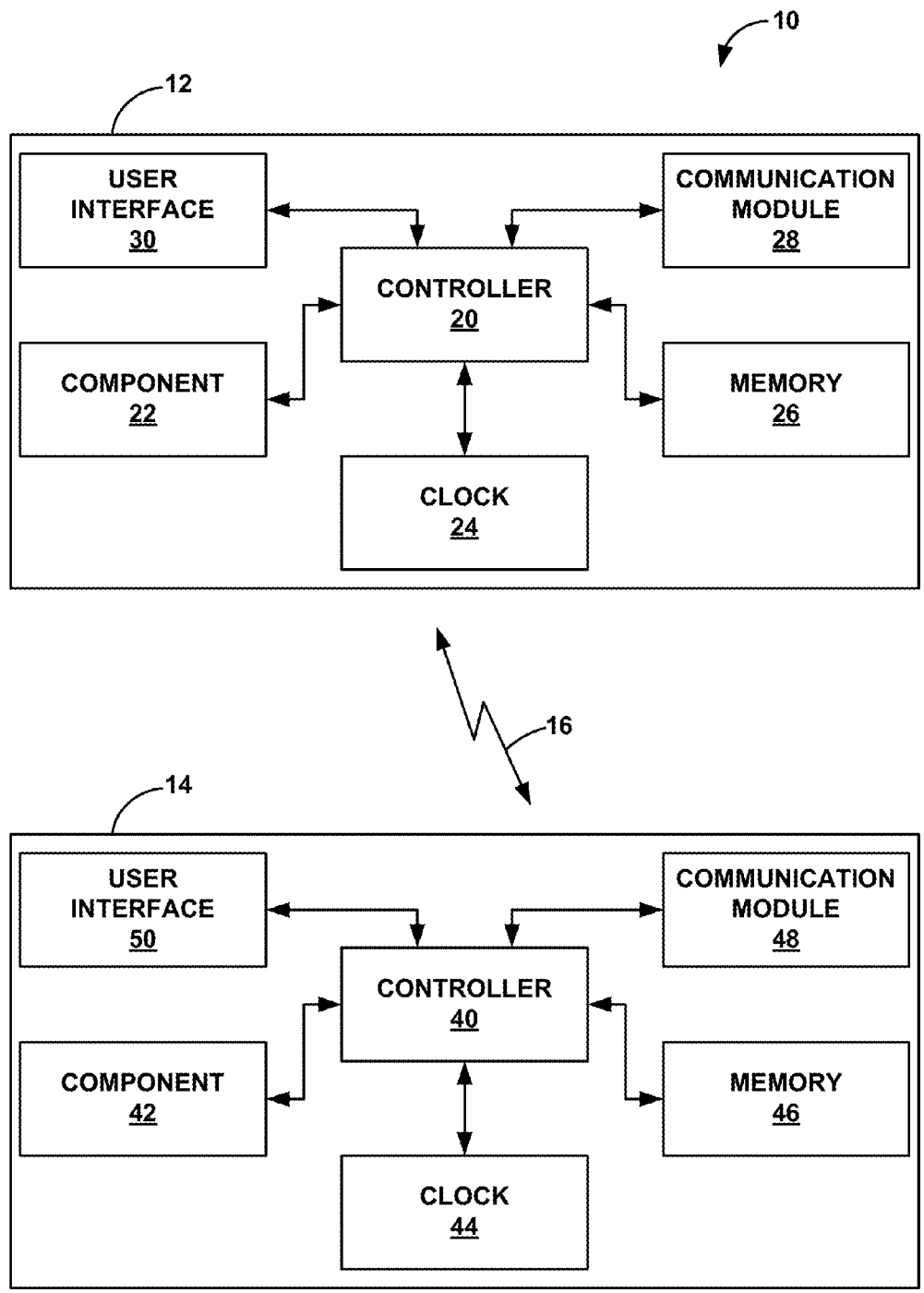
FIG. 1 is a functional block diagram of a system that includes a first node and a second node configured to communicate with each other and authenticate each other based on a key generated based on a physics-based output of a component.

Example devices, systems, and techniques for securing communication between two or more nodes are described in this disclosure. The nodes may be, for example, devices (e.g., computing devices or another electronic system) of a network that are in the same location or at different locations, elements of a common device (e.g., two integrated circuits of a computing device), or any other entities that may communicate with each other to, for example, exchange information or relay information between entities. As discussed in further detail below, in some examples, keys generated based on physics-based outputs of components may be used to secure communications between two or more nodes. For example, the keys may be used to authenticate trust for a communication (e.g., a communication signal or packet, such as a data packet, communication packet, or instruction packet) that is sent or received by a node within a predetermined time period associated with the keys. The keys may be regenerated periodically, e.g., as the output of the components change, such that the keys may only be used to authenticate communications between two or more nodes during a predetermined time period. A physics-based output of a component may be, for example, a particle or waveform, and may be based on the physical configuration of the component. For example, the physics-based output may be characteristic of one or more physical characteristics of the component. In this way, the keys used to secure communication between two nodes may be physical functions of the respective nodes.

In addition to, or instead of, using physics-based outputs from components for authenticating communications between two or more nodes, in some examples, physics-based keys may be used to encrypt and decrypt data communicated between two or more nodes. For example, a first node may use a first key generated based on a physics-based output of a first component of the first node to encrypt data, and a second node may receive the encrypted data from the first node and decrypt the data using a second key generated based on a physics-based output of a second component of the second node. The first and second keys are substantially similar and may be generated by the respective nodes at substantially the same time.

Securing communication between two or more nodes using the devices, systems, and techniques described herein may help secure a host node's critical program information, proprietary data, intellectual property, or any combination thereof, and help prevent eavesdropping of the communications by a third party, interception of information being communicated between the nodes by a third party, or corruption of the information being communicated between the nodes.

Secure communications may help protect personnel, security interests, and critical infrastructure. Adversaries may gain access to critical assets through operating systems, information technology, and networks used as the media for delivering communications for command and control operations to these assets. Securing communication between two or more nodes using keys generated based on physics-based outputs of components may help minimize or even prevent reverse engineering.

FIG. 1 is a functional block diagram of system 10, which include first node 12 and second node 14. First node 12 and second node 14 are configured to communicate with each other via communication channel 16, which may be a wired communication channel, a wireless communication channel, an optical communication channel or a combination of any two or more of wired, optical, and wireless communication channels. In some examples, first and second nodes 12, 14, respectively, may each be an electronic device (e.g., a computing device or a secure communication terminal) that is configured to send and receive data over communications channel 16. In addition, or instead, one or both nodes 12, 14 may be a router configured to route (or relay) communications (e.g., messages) transmitted by one entity to another entity of system 10.

Nodes 12, 14 may be a part of any suitable type of network in which at least one node 12 or 14 is configured to send data to the other node 12 or 14, which is configured to receive the data. In some examples, nodes 12, 14 are configured to both send and receive data from each other. Nodes 12, 14 may be a part of any suitable type of network in which nodes 12, 14 may send or receive information, and, in some cases, share resources, with each other, and, in some examples, other additional nodes of the network (not shown in FIG. 1).

As discussed in further detail below, nodes of system 10, including nodes 12, 14, may be configured to generate substantially the same key (e.g., the same or nearly the same) based on the physics-based outputs generated by the respective components at substantially the same time (e.g., the same or nearly the same). The components of each of the nodes of system 10 that are configured to securely communicate with each other are configured to generate substantially the same output at substantially the same time, such that the keys generated based on the physics-based outputs are substantially the same. These keys may be referred to as "time matched" in that they are generated based on the outputs of the respective components generated at substantially the same time. The nodes of system 10 may authenticate each other, messages received from another node of system 10, encrypt data transmitted to another node of system, decrypt data received from another node of system 10, or any combination thereof using time-matched keys. In some examples, nodes of system 10 may be configured to encrypt and decrypt data communication with each other using another key in addition to, or instead of, the physics-based key.

In the example shown in FIG. 1, first node 12 comprises controller 20, component 22, clock 24, memory 26, communications module 28, and user interface 30. Controller 20 may be configured to control the operation of component 22, clock 24, and communications module 28, and is configured to receive user input via user interface 30, and store data to and retrieve data from memory 26. Controller 20 can comprise any suitable arrangement of hardware, software, firmware, or any combination thereof, to perform the techniques attributed to controller 20 and first node 12 herein. For example, controller may include any one or more microprocessors, digital signal processors (DSPs), application specific integrated circuits (ASICs), field programmable gate arrays (FPGAs), or any other equivalent integrated or discrete logic circuitry, as well as any combinations of such components.

Controller 20 is configured to receive information indicative of the output generated by component 22 and generate a key based on the detected output. For example, as described with respect to FIGS. 3 and 4, controller 20 may implement an algorithm (e.g., a software algorithm) to generate a digital key from an analog output generated by component 22. The information indicative of the output generated by component 22 may be, for example, a electrical signal generated by component 22, a parameterized electrical signal generated by component 22, or data generated based on the raw electrical signal generated by component 22, such as one or more signal characteristics extracted from the electrical signal.

Component 22 is a physical structure that is configured to generate a detectable output, such as an analog output (e.g., an analog electrical signal), a quantum output (e.g., a particle or photon), or an electromagnetic output (e.g., a change in an orientation of a plane of polarization of a layer of component 22). The output of component 22 may be received by controller 20 (directly or indirectly) as an electrical signal. In some examples, the type of component 22 for a particular node 12 may be selected based on the operating environment in which node 12 is expected to be used or designed to be used, such that component 22 exhibits robust stability through use in the operating environment. In some examples, component 22 is also selected to be the same of component as the components of other nodes of system 10.

The output generated by component 22 may be based on, and in some cases, unique to, the physical configuration of component 22. The output generated by component 22 is dependent on the physical configuration (e.g., characteristics, such as, but not limited to, the chemical composition, the macro-dimensions of the component, the micro-structure of the component, the type of component, or any combination thereof) of component 22, and may be referred to as a physics-based output. In this way, the output generated by component 22 is a function of the physical configuration of component 22, and is modulated by the physical configuration of component 22. The differences in the physical configuration of component 22 that may modulate the output generated by component 22 may not significantly affect the performance of component 22. However, differences in the physical configuration between components may provide a rich source of variation in the output (e.g., an analog output) that can be exploited to generate a key.

As described in further detail below, the output generated by component 22 may be modified by changing the physical characteristics of component 22, the input provided to component 22 to generate the output, or both. In this way, a key generated by node 12 may be modified without having to replace component 22. The output of component 22 is modified in some examples in this manner in order to match the output of component 22 to a component of another node, such as component 24 of node 14. Physically random functions of two components are modified in some examples described herein to behave the same in a distinct, unique set of devices.

Due at least in part to the ability to modify the physics-based output of component 22, a plurality of components 22 may be fabricated (e.g., in a die) in a common lot and may be configured to behave similarly. The components that are configured to behave similarly, either through physical modification or modification to the inputs to the components, may then be used in a system 10 to authenticate nodes 12, 14 or to encrypt/decrypt data transmitted between nodes 12, 14.

In some examples, component 22 may incidentally generate the output, e.g., statically, or component 22 may generate the output in response to a stimulus applied to component 22 (e.g., by controller 20). While the output generated by component 22 is primarily described as an analog output in the description below, in other examples, the component may be configured to generate a digital output.

In some examples, component 22 includes one or more of an emitter, a sensor, or a sensor array. For example, component 22 may include one or more vibration beam structures (e.g., one or more cantilever beams, micro-cantilever beams, or micro-resonating gyros) that are each configured to resonate (or oscillate) in response to a stimulus. In some examples, component 22 includes a plurality of beam structures arranged in an array, such as a one-dimensional array or a two-dimensional array. The beam structures may, for example, may be fabricated as part of a larger array of components on a semiconductor die. The oscillations of the beam structures in response to the application of the stimulus may generate an output that component 22, e.g., with the aid of one or more sensors, may convert into an analog electrical signal. For example, node 12 or component 22 may include one or more piezoresistive elements that are sensitive to the stresses induced in the beam structures due to the oscillation of the beams. The one or more piezoresistive elements may each be configured to generate an analog electrical signal that changes as a function of the oscillation of a respective one or more of the beams. The analog electrical signal generated by the one or more piezoresistive elements may the output generated by component 22 with which controller 20 generates a key.

The output generated by the oscillations of a plurality of beam structures may work together to generate the output of component 22 with which controller 20 generates a key. In addition to, or instead of, all of the beam structures of component 22 being used to generate the output, the output may be generated based on the output from a select subset of the beam structures. For example, controller 20 may be configured to apply a stimulus to a select subset of the beam structures, and the selected subset of the beam structures may generate the output of component with which controller 20 generates the key. As another example, controller 20 may be configured to apply a stimulus to component 22 and all of the beam structures, but may only sense (e.g., via one or more piezoresistive elements or other sensors) the output from a selected subset of the beam structures. In this way, controller 20 may actively change the key that is generated by changing the beam structures that are used to generate the output of component 22, and without having to replace the entire component 22.

In some examples in which component 22 includes one or more beam structures, component 22 may also generate a static output (e.g., not specifically in response to a stimulus applied to component 22, but in response to environmental stimuli incidental to the use of node 12). For examples, the beam structures of component 22 may oscillate in response to environmental stimuli not purposefully applied to component 22 to generate an output, and one or more piezoresistive elements may each be configured to generate an electrical signal that changes as a function of the oscillation of a respective one or more of the beam structures. Thus, in some examples, controller 20 is configured to generate a key based on the static signal generated by one or more beam structures.

In some examples in which component 22 includes one or more beam structures, the output of component 22 may be modified by, for example, modifying the stimulus or other input (if any) applied to component 22 to generate the output, modifying one or more physical characteristics of one or more beam structures (e.g., modifying a length of a beam, changing a material of a beam, such as by adding a material to the beam, and the like), modifying the subset of beam structures that generate the output of component 22, or any combination thereof.

In some examples, component 22 comprising an array of beam structures may be fabricated on a semiconductor die using a lithographic process. Lithography masks may be used to define the patterned features of the beam structures. In some cases, the fabrication process may introduce minor variations in the physical characteristics of the beam structures such as the length, width, and thickness of the beam structures within the same die or wafer and across multiple wafers. The variations in the physical characteristics of the beam structures may result in a plurality of beam structures configured to generate different outputs in response to the same stimulus. Controller 20 may take advantage of the slight variations in physical characteristics of the beam structures to produce different keys from the different outputs from different beam structures. In some examples, the beam structures may display a unique analog output for each individual beam structure of component 22.

In addition, using components including a plurality of beam structures to provide the physics-based output with which nodes 12, 14 generate keys may permit modification of a fabricated lot of components 22 (e.g., fabricated as individual dice) through materials and processes or by embedded stimulus to render components 22 that provide the same pattern of unique analog signals. Component 22 comprising a plurality of beam structures may be amenable to obfuscation or low observability. In addition, component 22 comprising a plurality of beam structures may be designed such that an attempt to measure the physical characteristics of component 22 may change or destroy the characteristics of one or more beam structures, and, therefore, the output generated by component 22 may change in response to the attempt to measure the physical characteristics of component 22. This may ultimately change the key generated by controller 20 and cause the key generated by controller 20 of node 12 to be different than a key generated by another node of system 10.

In another example, component 22 may comprise one or more pH sensors, such as an ion sensitive field effect transistor (ISFET). An ISFET may be used to detect a pH level of a media in which the ISFET is immersed. When the ion concentration in the media changes, the current through the transistor may change accordingly. In this way, an electrical signal input to the ISFET may be modulated by the pH level of the media to generate an output electrical signal. One type of electronic pH sensor is a silicon micro-electro-mechanical system (MEMS) device that utilizes a metal-oxide-semiconductor field-effect transistor (MOSFET) structure in combination with a reference electrode to detect pH.

In another example, component 22 may comprise a sensor (e.g., a solid state sensor) that is configured to change resistance based on the temperature of the sensor. Controller 20 may be configured to modulate the output of such a component 22 by, for example, modifying the temperature of the sensor, e.g., with the aid of a thermal device that is configured to change a temperature of the sensor.

In another example, component 22 may comprise one or more magnetic permalloy magnetic sensors (e.g., patterned or contiguous thin film structures) configured to generate a resistance output. The output generated by a magnetic permalloy magnetic sensor may be modified by modifying the resistance of the sensor. For example, in examples in which the magnetic permalloy magnetic sensor is formed from a thin film structure, the value of the resistance output and performance of the magnetic sensor can be dependent on the integrity of the film. Thus, the film may be disturbed (e.g., physically) to modify the resistance properties, and, therefore, the resistance output. In this way, the film may be modified to change a signal generated by component 22 and used to generate a physics-based key used to authenticate node 12. The signal generated by component 22 may be modified to match the output of component 24.

In another example, component 22 may comprise an optical sensor (e.g., a solid state sensor defining a plurality of vixels) that is configured to generate different optical signals in response to different optical inputs or based on the optically conductive pathway of component 22 selected for the transmission of one or more optical signals. For example, the optical sensor may include a plurality of optically conductive pathways through which an optical signal may traverse, and at least two of the optically conductive pathways may be configured to modulate the optical signal in different ways due to, for example, different lengths, different optically conductive materials, different optical elements, or any combination thereof. Thus, depending on the optically conductive pathway through which controller 20 transmits the optical signal, the output of the optical sensor may differ.

In some examples, each of the optically conductive pathways of the optical sensor may be configured to modulate the optical signal in different ways, and, therefore, the optical sensor may be configured output different signals depending on the one or more optical channels through which controller 20 transmits an optical signal. In some examples, the optical sensor may include one or more switches that may open or close to generate different pathways, and controller 20 may select one or more conductive pathways of the optical sensor by, for example, controlling one or more switches to open or close to define the optically conductive pathways through which one or more optical signals are transmitted.

In another example, component 22 may comprise a pressure sensor that is configured to generate a different output signal in response to different input. For example, component 22 may include an array pressure transducers, which are each configured to exhibit a different resistance, depending on the force applied to the pressure transducer. Under the control of controller 20, component 22 may be configured to activate different pressure transducers and apply different forces to select one or more pressure transducers of the array, thereby changing the resistivity of component 22. Thus, component 22 may be configured to generate different output electrical signals in response to the same input electrical signal, depending on the pressure transducers that are active.

In another example, component 22 may comprise a quantum device that is configured to generate a quantum output. For example, component 22 may be configured to include a plurality of particles that may lie in-plane our not-in-plane. The sequential particle count of in-plane and not-in-plane photons over a predetermined time period may provide the basis of a bit stream that can be used as a quantum output. Component 22 may include a filter through which in-plane photons that co-align with may pass through the filter based on photon filtering. In some examples, particles aligned to the detector in an atomic clock (e.g., an example of clock 24) may be used to detect the in-plane photons that pass through the filter.

More than one type of component 22 may be used. In addition, each of the types of components 22 described above may be used alone or in combination with each other to generate an output that changes as a function of the physical configuration of the components. In some examples, component 22 may also be referred to as a sensor in that component 22 may convert a physical quantity into a signal that can be read and received by controller 20 or another element. For example, component 22 may be configured to sense emissions (e.g., radiofrequency fields, thermal emissions, ion emissions, millimeter wave emissions, ultra-violet light emissions, infrared emissions (blackbody emitter), and generate an output based on the sensed emissions. The emissions may be generated by the external environment in which node 12 is used or within a control environment within node 12 in which component 22 operates.

In some examples, the output generated by component 22 may be random and non-deterministic, such that a key generated by controller 20 based on the output of component 22 may also be random and non-deterministic in some examples. The output of component 22 may also vary over time, e.g., as component 22 ages or otherwise changes physical configurations, as controller 20 selects different subcomponents of component 22 to generate the output, as the input provided by controller 20 to component 22 to generate the output varies, or any combination thereof. The variance in the output of component 22 over time may also help further obfuscate the key generated by controller 20 based on the output of component 22.

In some examples, the key generated by controller 20 based on the output generated by component 22 is an authentication key with which controller 20 may authenticate node 14, authenticate node 12 to another node 14, or authenticate a message (e.g., authenticate trust for a communication signal or packet) received from another node 14. In addition, or instead, the key generated by controller may be an encryption key with which controller 20 may encrypt data to be transmitted to another node 14, decrypt data received from node 14, or any combination thereof. In this way, the node or message authentication or the encryption/decryption of data may be based on a function that is related to the physical configuration of component 22.

Node 12 may use the key generated by controller 20 based on the physics-based output of component 22 for any one or more anti-tamper applications, including, but not limited to, authentication of first node 12 to second node 14, authentication of second node 14 to first node 12, and encryption of data that is transmitted to second node 14, decryption of data received from second node 14, or any combination of these purposes. Thus, the key generated based on a physics-based output of component 22 may have multi-purpose anti-tamper applications in some examples.

The output of component 22 may change over time, such that controller 20 may generate different keys at different times, depending on the output of component 22 at the time the key is generated. In this way, the key with which controller 20 authenticates communications with another node 14 may be mutable. The mutability of the key with each instantiation of key generation may provide a basis for defining keys that are difficult to reverse engineer, e.g., by power analysis (as described in further detail below).

Moreover, in some examples, the output of component 22 is a discrete signal that only exists in real-time, e.g., as power is applied to component 22, such that the key generated by controller 20 based on the discrete signal may be relatively transient. The relatively transient nature of the key may also provide a basis for defining keys that are difficult to reverse engineer.

In some examples, controller 20 may not store the key in memory 26 of node 12 or a memory of another device. For example, the key may be a discrete signal that only exists in real-time while component 22 is active and generating the particular output with which controller 20 generates the key.

In other examples, however, controller 20 may store the key in memory 26 (or a memory of another device) for a relatively short period of time, such as on the order of nanoseconds or seconds. The period of time that the key is stored may be predetermined and selected based on, for example, the expected transmission time of a message from node 14 to node 12, which vary based on the size of the message (e.g., an electronic mail message), the distance the message travels, and the like. This may enable the transmission and authentication of the message to be completed before the key generated by controller 20 is automatically deleted by controller 20. For example, the period of time that the key is stored may be selected to be as long as it takes to route through the network (e.g., 1 minute). In this example, the period of time that the key is stored may vary based on the remoteness of node 12 relative to node 14 and the backlog in the server as packets are processed. Controller 20 may be configured to automatically delete the key after a predetermined amount of time, such that no key is permanently stored by node 12.

As discussed in further detail below, nodes 12, 14 of system may be configured to generate substantially the same key (e.g., the same or nearly the same) based on the physics-based outputs generate by the respective components at substantially the same time (e.g., the same or nearly the same). These keys may be referred to as "time matched" in that they are generated based on the outputs of the respective components generated at substantially the same time. Controller 20 may be configured store a particular key long enough to receive the time-matched key generated by node 14. In order to authenticate node 14, a message from node 14, encrypt data transmitted to node 14, or decrypt data received from node 14, or otherwise use the key, the key generated by controller 20 is time matched to a key generated by node 14. Controller 20 may store the key long enough to receive the time matched key generated by node 14 and to compare the keys.

In some examples in which controller 20 stores a key generated based on the output of component 22, controller 20 may store a plurality of keys, e.g., in a registry of keys, with an indication of the time at which output of component 22 used to generate the respective key was generated. Such a registry of keys may be useful to time match a key with a key received from node 14. Node 12 may be configured such that the keys are only stored in the registry for a relatively short period of time, as discussed above.

In some examples, component 22 is an element of node 12 that is dedicated to generating the output used to generate the key. In other examples, component 22 is configured to provide a function in addition to generating the output used to generate the key. For example, component 22 may be a part of clock 24, communication module 28, or controller 20.

Figure 5:
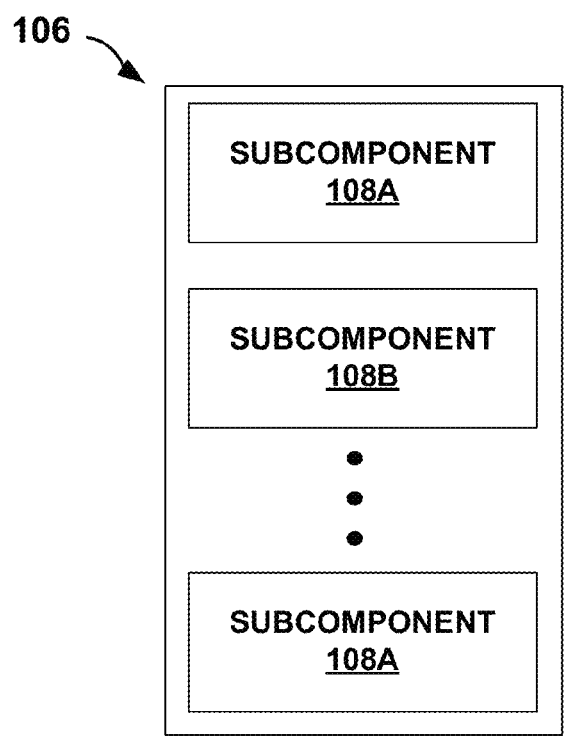
FIG. 5 is a conceptual illustration of an example component that includes a plurality of subcomponents that may each be configured to generate a physics-based output, which may individually or collectively generate the physics-based output of the component.

In some examples, as described in further detail with respect to FIG. 5, component 22 may include a plurality of sub-components that are configured to cooperate to generate a detectable output of component 22. Component 22 may be configured in some examples such that controller 20 may generate a key based on the output from a subset of the sub-components of controller 22, where the subset may include one sub-component, all the sub-components, or some number of sub-components less than all the sub-components.

In some examples, node 12 includes a semiconductor die that includes component 22. The semiconductor die may be a part of a lot of die (e.g., formed from a common wafer) that are configured to generate substantially matching (e.g., matching or nearly matching) outputs at substantially the same time, where the outputs are unique to the die lot. For example, the chemical or mechanical configuration of the die may be modified until the die of the lot generate substantially matching outputs. In addition, or instead, a stimulant (e.g., a vibrational source) that renders matched keysets unique to the die lot may be deposited on the die as part of the manufacturing process. The semiconductor die may also include one or more additional elements of node 12, such as one or more of controller 20, clock 24, memory 26, and communications module 28.

The characteristics of component 22 that modulate the output generated by component 22 in response to a particular input or statically generated by component 22 may be difficult for an adversary to predict or measure from inspection of component 22. In addition, the physical configuration of component 22 may also be very difficult or even impossible to reproduce without access to manufacturing equipment similar to that used to fabricate and tune component 22. Without detailed knowledge of the physical configuration of component 22 and the matching process for time-matching the output of component 22 to a component of another node, it may be relatively difficult for an adversary to produce counterfeit copies of component 22 that accurately reproduce the characteristics of component 22. Even with access to manufacturing equipment and lithographic masks used to fabricate component 22, an adversary may not have detailed knowledge of specific configuration processes used to create matched pairs of component 22.

Due to the transient nature of the output generated by component 22 and the transient nature of the resulting key generated by controller 20 based on the physics-based output of component 22, the creation of a key by controller 20 and, as discussed in further detail below, the comparison of the key with a key received from the node to be authenticated, are timed with relatively high precision in order to enable time matching of keys with other nodes, such as second node 14.

Clock 24 is configured to generate a clock signal that is received by controller 20. Controller 20 may use the clock signal from clock 24 to coordinate the generation of a key from the output of component 22 with the generation of a key by other nodes of system 10, such as node 14, and the comparison of the keys. With the aid of clock 24, controller 20 may be configured to maintain a precise time-table for generating a unique key that has no permanence in network equipment. In some examples, a master clock located remotely, e.g., in a mainframe system housed in a closed ecosystem, may use its high precision timing to maintain fidelity between clock 24 and clocks of other nodes, such as clock 44 of node 14.

The timing for time-matching keys and comparing the time-matched keys in system 10 may be provided by various timing technologies from relatively low-precision technologies (e.g. oscillators) to relatively high-precision technologies (e.g. atomic clocks). Clock 24 may use any suitable clock technology, such as, but not limited to, one or more of an oscillator technology or atomic clock technology (e.g., chip-scale atomic clocks or cold-atom, atomic clocks). In some examples, clock 24 is an atomic clock and component 22 and clock 24 are provided by the same element, such that an atomic clock may be used alone or in conjunction with other components to generate a physics-based output based on which controller 20 generates a key.

In order to authenticate second node 14 (e.g., authenticate trust for communication, such as a signal or packet, sent by second node 14 and received by first node 12), controller 20 may compare a first key generated based on output from component 22 with a second key received from and generated by node 14. In response to determining the keys substantially match (e.g., match or nearly match), controller 20 may determine that node 14 is authenticated. In some examples, after authenticating node 14 based on the comparison of the first and second keys, controller 20 may begin or continue exchanging data with node 14 via communication channel 16. In some examples, controller 20 authenticates second node 14 prior to exchanging any data (e.g., receiving data from or transmitting data to) other than the key with node 14. In other examples, however, controller 20 may exchange data with second node 14 prior to or in parallel with authenticating node 14.

Memory 26 is configured to store data that may be used, e.g., by controller 20, to authenticate second node 14 during communication between first node 12 and second node 14. Memory 26 may include any volatile or non-volatile media, such as a random access memory (RAM), read only memory (ROM), non-volatile RAM (NVRAM), electrically erasable programmable ROM (EEPROM), flash memory, and the like. In some examples, memory 12 may be internal to controller 20. For example, memory 26 may be enclosed in a common housing as controller 20, on the same integrated circuit chip as controller 20, or both. In other examples, memory 26 may be external to controller 20, e.g., may be external to a package in which controller 20 is housed. For example, controller 20 may be defined by a semiconductor device (e.g., using a system-on-chip design methodology) or a plurality of semiconductor devices and may be housed in a semiconductor package, and memory 26 may be external to that semiconductor package. In some of these examples, electrical signals transmit between memory 26 and controller 20 via one or more electrically conductive pathways (e.g., a data bus and address bus). In other examples, memory 26 and controller 20 may wirelessly communicate with each other.

Data stored by memory 26 can include, for example, critical program information for the operation of first node 12, protected intellectual property, and confidential information, such as classified information to which access is restricted by law or regulation to particular groups of persons. Authenticating second node 14 prior to receiving data from second node 14 or transmitting data to second node 14 may help reduce unauthorized technology transfer, may help protect any technological advantage provided to a particular entity from the knowledge and/or use of the stored data, and may help protect technological competitiveness afforded by the use of the stored data. Authenticating second node 14 using a physics-based output of component 22 may help minimize the possibility that node 12 may be reverse engineered by decreasing the accessibility to the contents of memory 26 through communications channel 16.

Communication module 28 is configured to support communication between first node 12 and another node of system 10 (e.g., second node 14) under the control of controller 20. Communication module 28 may accomplish communication with other nodes of system 10 using any suitable communication protocol, which may be a wired or wireless communication protocol.

In some examples, first node 12 comprises user interface 30, with which a user may interact with first node 12. User interface 30 may include, for example, a display, such as a liquid crystal display or light emitting diode display or other type of display screen, to present information to the user. In addition, user interface 30 may include an input mechanism to receive input from the user. The input mechanism may include, for example, one or more buttons, a keypad (e.g., an alphanumeric keypad), a peripheral pointing device, a touch screen display, or another input mechanism that allows the user to provide input.

In the example shown in FIG. 1, second node 14 comprises controller 40, component 42, clock 44, memory 46, communications module 48, and user interface 50. Controller 40, component 42, clock 44, memory 46, communications module 48, and user interface 50 may be similar (e.g., identical or nearly identical) to controller 20, component 22, clock 24, memory 26, communications module 28, and user interface 30, respectively, of node 12. Thus, the descriptions of controller 20, component 22, clock 24, memory 26, communications module 28, and user interface 30 apply to controller 40, component 42, clock 44, memory 46, communications module 48, and user interface 50, respectively, in some examples.

While two nodes 12, 14 are shown in FIG. 1, in other examples, system 10 includes a plurality of nodes similar to node 12, where the nodes are each configured to securely communicate with each other using the devices, systems, and techniques described herein.

Nodes 12, 14 of system 10 are configured to securely communicate with each other and, in some examples, other nodes in system 10, by at least authenticating the node with which information is being exchanged or authenticating a message received from the other node, e.g., prior to exchanging the information (e.g., prior to receiving information from the other node, transmitting information to the other node, or both) with the other node. For example, node 12 may authenticate node 14 to establish trust with node 14, e.g., by confirming that information is being exchanged with node 14 and not an adversary posing as node 14. Likewise, node 14 may authenticate node 12 to establish trust with node 12, e.g., to confirm that information is being exchanged with node 12 and not an adversary posing as node 12. As discussed in further detail below, in the example shown in FIG. 1, nodes 12, 14 are configured to authenticate each other prior based on physics-based keys generated based on the output from the respective components 22, 42. In this way, nodes 12, 14 are each configured to detect and exclude unauthorized communications based on physics-based keys.

Each of the nodes 12, 14 of system 10 includes component 22, 42, respectively, that is configured to generate a detectable physics-based output. Each controller 20, 40 is configured to detect the output from the respective component 22, 42, and generate a key based on the detected output. For ease of description, the key generated by controller 20 is referred to as a "first key" and the key generated by controller 40 is referred to as a "second key." The reference to "first" and "second" does impart any particular timing or other order to the keys.

A physical unclonable function (PUF) is a function that is embodied in a physical structure and unique to a component. The PUF may, in some cases, be used to identify a particular component. For example, component 22 may be associated with a particular output that may only be generated by component 22. In contrast to PUFs, the outputs generated by components 22, 42 with which the respective controllers 20, 40 generate a key may be substantially similar at substantially the same time. In this way, controllers 20, 40 are configured to generate substantially similar time-matched keys based on the outputs of different components 22, 42. In some examples, "substantially the same time" may indicate the same time or nearly the same time (e.g., within a second over a period of a month). In addition, "substantially similar" may mean identical or nearly identical and "time-matched" keys may refer to keys generated based on outputs generated by components 22, 42 at substantially the same time.

Nodes 12, 14 may be configured such that components 22, 42 generate substantially the same physics-based output at substantially the same time using any suitable technique. For example, components 22, 42 may have substantially similar physical characteristics or at least be modified to behave similarly, such that components 22, 42 are configured to generate substantially similar outputs at a particular point in time. The substantially similar outputs may be achieved by modifying the physical characteristics of one or both components 22, 42. In this way, components 22, 42 of different nodes 12, 14 can be modified to behave similarly, such that the resultant keys generated by the respective controllers 20, 40 can be created from the component outputs are similar and may be compared in order to authenticate communications between nodes 12, 14.

In addition to, or instead of, modifying the physical configuration of one or both components 22, 42, the input provided to components 22, 42 may be modified until components 22, 42 generate substantially the same output at substantially the same time. The inputs may differ depending on the type of component 22, 42 with which controllers 20, 40, respectively, generate the key. The inputs may be, for example, a vibratory input, an optical signal, an electrical signal, creating a particular operating temperature for components 22, 42, and the like.

The output of components 22, 42 may change over time, such that controllers 20, 40 may generate different keys at different times, depending on the output of the respective components 22, 42 with which the key is generated. In this way, the key with which controllers 20, 40 of nodes 12, 14 authenticate communications with the other node 14, 12 may be mutable. Moreover, in some examples, the outputs of components 22, 42 are discrete signals that only exist in real-time, such that the keys generated by controllers 20, 40 based on the discrete signals may be relatively transient and not stored in memories 26, 46, respectively, of or a memory of another device, or stored in memories 26, 46 for a relatively short period of time, as described above with respect to node 12.

Due to the relatively transient nature of the output generated by components 22, 42, and the transient nature of the resulting keys generated based on the physics-based outputs of components 22, 42, the creation and comparison of the keys generated from the components 22, 42 of respective nodes 12, 14 are timed with relatively high precision in order to time match the keys. The ability of nodes 12, 14 to properly authenticate communications with each other may depend on the timing of the generation and comparison of the keys. The output generated by components 22, 42 may change over time, such that the first and second keys may change, depending on the time at which respective controller 20, 40 generates the key. Thus, when the first and second keys are generated by controllers 20, 40, respectively, based on outputs of components 22, 42 generated at substantially the same time, the first and second keys substantially match (e.g., are identical or nearly identical). In order to authenticate communications between nodes 12, 14, clocks 24, 44 of nodes 12, 14, respectively, are substantially synchronized such that nodes 12, 14 are configured to generate time-matched keys. In some examples, clocks 24, 44 are configured to maintain substantially the same time and may only have a drift about one nanosecond per day relative to each other. Other precision standards may also be used.

Clocks 24, 44 of nodes 12, 14, respectively, may be substantially synchronized (synchronized or nearly synchronized) such that controllers 20, 40 may generate keys based on the output of the respective components 22, 42 generated by the components 22, 42 at substantially similar times in order to generate substantially similar time-matched keys. For example, clocks 24, 44 may help controllers 20, 40 determine which one or more outputs of component 22, 42, respectively, should be used to generate a key. In some examples, a master clock located remotely, e.g., in a mainframe of system 10, may use its relatively high precision timing to maintain fidelity between clocks 24, 44 of nodes 12, 14, respectively.

As an example of how controllers 20, 40 may use the respective clock 24, 44 to generate time-matched keys, in examples in which components 22, 42 each comprise one or more beam structures, controllers 20, 40 may each, with the aid of the respective clock 24, 44, count the number of oscillations of the respective beam structure over a specified time interval and generate the respective key based on the number of oscillations counted over the specified time interval. When clocks 22, 42 are substantially synchronized, the time intervals may be the same, and, as a result, controllers 20, 40 may generate time-matched keys.

In another example, controllers 20, 40 may use the respective clock 24, 44 to time the application of a stimulus (e.g., by a stimulus source) to the respective component 22, 42. With some types of components 22, 42 (e.g., beam structures), the timing of the stimulus may affect the output generated by the component 22, 42 at a particular time. In order to generate time-matched keys, controllers 20, 40 generate the keys based on the substantially similar outputs of the respective components 22, 42, which are generated by the components 22, 42 at substantially similar times. Thus, the timing of the stimuli applied to the component 22, 42 may affect the ability to generate time-matched keys in some examples. In addition, in some cases, controllers 20, 40 may control a stimulus source to apply a pattern of stimuli to the respective components 22, 42 to generate the keys. Clocks 24, 44 may help controllers 20, 40 substantially synchronize (in time) the application of a stimulus or a pattern of stimuli to the respective components 22, 42. An application of a pattern of stimuli to a component 22 or 42 may cause the component 22 or 42 to generate a plurality of outputs (e.g., one output in response to a single stimulus), which the respective controller 22, 42 may use to generate a key.

Nodes 12, 14 may authenticate each other by at least comparing time-matched keys. In response to determining a key received from another node substantially matches (e.g., is identical to or nearly identical to) the time-matched key generated by the receiving controller 20 or 40, the receiving controller 20 or 40 may confirm the validity of the other from which the key was received (or the validity of the message), and, therefore, authenticate the other node (or message) from which the time-matched key was received. In some examples, keys may "substantially match" when the keys are identical or nearly identical.

In examples in which node 12 wants to communicate (e.g., exchange information) with node 14, controller 20 may authenticate node 14 by, for example, controlling communication module 28 to transmit a request (e.g., a signal) for a key to node 14 via communications channel 16. Controller 40 of node 12 may receive the request from node 12 via communications module 48. In response to receiving the request, controller 40 of second node 14 may generate a second key based on the output of component 42 generated by component 42 at time $T_2$. Under the control of controller 40, communication module 48 may transmit the second key to node 12 via communications channel 16. Controller 20 may receive the second key via communications module 28.

Controller 20 of first node 12 may generate a first key based on a physics-based output of component 22 generated by component 22 at time $T_1$. First time $T_1$ and second time $T_2$ at which components 22, 42, respectively, generated the outputs with which controllers 20, 40 generate the first and second keys, respectively, may be substantially the same. Controllers 20, 40 are configured to coordinate the generation of the keys based on the outputs of components 22, 42, respectively, generated at substantially the same time, such that the keys are time-matched. For example, controllers 20, 40 may be configured to generate the keys based on the outputs generated by the respective components 22, 42 at a specific time. Clocks 24, 44 of nodes 12, 14, respectively, may be synchronized such that when controller 20 generates the first key based on the output generated by component 22 at the specific time, controller 40 generates the second key based on the output generated by component 42 at that specific time. In this way, controllers 20, 40 may generate time-matched keys by at least generate the keys based on the output generated by the respective components 22, 42 at substantially the same time (e.g., the exact same time or as close to the same time as permitted by clocks 24, 44).

Controller 20 may authenticate second node 14 by at least comparing the time-matched first and second keys. In response to determining the first and second keys do not substantially match, controller 20 may determine second node 14 did not successfully authenticate itself, and may then stop any further exchange of information with second node 14. In some examples, controller 20 generates an indication in response to determining the first and second keys do not substantially match. The indication may indicate, for example, indication that there was a potential tampering with node 12, node 14, or that the communication between nodes 12, 14 was compromised. In some examples, the indication may be a flag, value, or other indication stored by memory 26 of node 12, a notification (e.g., signal) transmitted to another device in communication with node 12, or both. In addition, in some examples, controller 20 may destroy some or all information stored by memory 26 in response to determining node 14 improperly attempted to communicate with node 12.

On the other hand, in response to determining the time-matched first and second keys substantially match, controller 20 may confirm the validity of second node 14, and, therefore, authenticate second node 14. In this way, first node 12 may authenticate second node 14 based on a physics-generated key by comparing the authentication key transmitted by the second node with the authentication key generated by the first node, and without relying on an authentication key stored in memory 26. After authenticating second node 14, controller 20 may exchange information with second node 14.

In some examples, first node 12 may implement the technique described above to authenticate specific messages transmitted from node 14, rather than authenticating node 14. The time-matched physics-based keys described herein may be used to authenticate another node or a specific message transmitted by another node.

In some examples, two-way authentication is performed before nodes 12, 14 may exchange information (other than keys) with each other. For example, prior to exchanging information (other than keys), node 12 may authenticate node 14 using the technique described above, and node 14 may likewise authenticate node 12 using a similar technique. For example, controller 40 may authenticate first node 12 by, for example, controlling communication module 48 to transmit a request (e.g., a signal) for a key to node 12 via communications channel 16. Controller 20 of node 12 may receive the request from node 12 via communications module 28. In response to receiving the request, controller 20 of first node 12 may transmit the first key to second node 14 via the respective communication modules 28, 48. Controller 40 of second node 14 may receive the first key from node 12 and may authenticate first node 12 by at least comparing the time-matched first and second keys. In response to determining the first and second keys substantially match, controller 40 may confirm the validity of first node 12, and, therefore, authenticate node 12. After authenticating node 12, controller 40 may exchange information with node 12.

In some examples, controllers 20, 40 may be configured to generate respective physics-based keys at specific time intervals. Communications received by nodes 12, 14 during a particular time interval may then be authenticated based on the physics-based keys associated with the time interval. A node 12 or 14 may transmit a physics-based key with a communication, where the physics-based key is associated with the time interval in which the communication is being sent by the node, and the receiving node 14 or 12 may authenticate the communication based on the received physics-based key and the physics-based key generated by the receiving node and associated with the time interval.

In some examples, outputs from components 22, 42 with which controllers 20, 40, respectively, generate the first and second keys are discrete signals that only exists in real-time while the components 22, 42 are active and generating the particular outputs. Controllers 20, 40 may regenerate the first and second keys, respectively, periodically, e.g., as the output of the components 22, 42 change, such that the keys may only be used to authenticate communications between nodes 12, 14 during a particular time period. Thus, in some examples, a particular set of time-matched first and second keys may only be used to authenticate communications (or encrypt/decrypt data) for a particular time period. The time period may have a predetermined duration in some examples, and, in other examples, may not be predetermined. Moreover, the time period during which controllers 20, 40 may authenticate the other node 14, 12, respectively, based on a particular key may vary, depending on the frequency with which controllers 20, 42 regenerate the keys.

In some examples, one or more nodes of system 10 may include one or more router, and the one or more routers may be configured to help ensure the keys are transmitted between nodes 12, 14 within a timeframe that will permit matching and authentication of the keys.

The devices, systems, and techniques described herein that uses cryptographic technology that produces unique, complex keys derived from physics-based sources may help minimize or even eliminate the possibility that the keys may be obtained by an adversary. For example, the keys may be transient in nature and not stored in a memory or stored in memory for a relatively short period of time, thereby eliminating one channel through which an adversary may obtain the keys. Even if the keys are stored in a memory, the keys change over time, such that the possibility that the keys may be obtained by an adversary in time for the adversary to use the keys to gain unauthorized access to other information from nodes 12, 14 may be reduced. In addition, the transient nature of the outputs generated by components 22, 42 may help prevent spoofing of the physics-based keys by an adversary.

System 10 including nodes 12, 14 that use concurrent physics-based signal generation and precise timing technology to authenticate communications and, in some examples, encrypt/decrypt data, may help reduce the vulnerabilities of system 10 to reverse engineering or other attacks that may compromise the security of nodes 12, 14. An adversary may attempt to gain access to the secure communications between nodes 12, 14 through one or more means, including accessing authentication or encryption keys resident or re-assembled in one or both of nodes 12, 14, or by determining an authentication or encryption key through a side channel attack, such as simple power analysis, differential power analysis, correlation power analysis, and a template attack. In some cases, key generation techniques described herein that use a physics-based output of a component may help mitigate electronic tampering from side channel attacks and through access the authentication or encryption keys. For example, the transient existence of the first and second keys generated by nodes 12, 14 for authentication, encryption, or both, may help combat power analysis techniques. A side channel attack may be, for example, an attack on system 10 based on information that is obtained from an analysis of the physical operation of system 10, such as the power consumed by system 10 during its operation and/or the sounds generated by system 10 during its operation.

Simple power analysis is a side channel attack which involves visual examination of the power consumption (e.g., the current used) of an electrical device (e.g., node 12 or node 14) over time in order to determine by statistics-based simple power analysis, an encryption or authentication key used by the device. The electrical device may consume different amounts of power consumption as it performs different operations, such that variations in power consumption over time may evidence the different operations of the device. If the device is a cryptographic system that encrypts stored data, an adversary may be able to extract encryption keys from the power consumption profiles. Within some cryptographic systems, the unique power profiles may alert the adversary to the cryptographic standard being used. For example, systems that encrypt data using the Data Encryption Standard (DES) use 16 rounds, which are 16 identical stages of processing (e.g., transforming) used to convert plain data into ciphered data. These rounds can easily be seen on a digital oscilloscope and may tip off the adversary to the implementation of the DES to encrypt the stored data. As another example, systems that encrypt data using the Advanced Encryption Standard (AES) may use 10, 12, or 14 rounds to convert plain data into ciphered data, depending on the selected key strength. The unique, complex keys derived from physics-based sources described herein may help reduce the possibility that an adversary may determine the key via a side channel attack.

As discussed above, the outputs generated by components 22, 42 may be a function of the physical configuration of the respective components 22, 42. Thus, as the physical characteristics of components 22, 42 change (e.g., due to aging) so may the keys generated by controllers 20, 40 based on the output of the respective component 22, 42. In addition, the output of the respective component 22, 42 may also change due to the nature of the type of output that inherently varies over time, such that the keys generated by controllers 20, 40 based on the output of the respective component 22, 42 may also change over time. In some cases, the keys generated by controllers 20, 40 may vary from one instantiation to the next.

Physical tampering with nodes 12, 14 may incidentally or purposefully change the physical structure of components 22, 42. For example, an adversary may attempt to examine node 12, such as by opening a housing of node 12 (in which components of node 12 are positioned) or by physically destructing the housing; during the physical tampering with the housing, the physical characteristics of component 22 may change, which may change the output generated by component 22. If second node 14 is not tampered with in an identical manner, then controllers 20, 40 of first and second nodes 12, 14, respectively, may generate different time-matched keys. As a result, controller 40 of second node 14 may not be able to match the second key generated by controller 40 with a time-matched first key generated by controller 20 of first node 12, and, therefore, may not authenticate first node 12 (or successfully encrypt or decrypt data). In response to determining the first and second keys do not match, controller 40 may prohibit further communication between node 14 and node 12 (e.g., by prohibiting further receipt of data from node 12 or transmission of data to node 12). In this way, the sensitivity of component 22, as well as component 42, to physical changes may help safeguard the contents of memory 26, 46, respectively, or other information stored by the nodes 12, 14, respectively. In addition, in this way, nodes 12, 14 may be self-protecting, and may inherently include an active volume barrier that helps prevent successful tampering with nodes 12, 14.

The elements of system 10 and nodes 12, 14 shown in FIG. 1 are merely one example. In other example, system 10, first node 12, and second node 14 may have a different configuration, such as a fewer or greater number of elements. For example, although controller 20 and clock 24 are described as separate modules, in some examples, the functionality of clock 24 may be integrated into controller 20. Similarly, in some examples, the functionality of clock 44 may be integrated into controller 40 of second node 14 in some examples. As another example, although not shown in FIG. 1, in some examples, nodes 12, 14 may each include a power source configured to deliver operating power to the respective node 12, 14. The power source may include, for example a battery and a power generation circuit. In other examples, nodes 12, 14 may receive power from an external power source.

As another example, in some examples, an electromagnetic interference (EMI) shield is formed over component 22, component 42, or both. The EMI shield may block EM radiation generated by the output (e.g., analog electrical signals) generated by component 22 or 42 from propagating to an exterior of the EMI shield. This may prevent a reverse engineer from measuring the EM radiation in an attempt to reverse engineer the output generated by component 22 or 42. The EMI shield may include, for example, an electrically conductive or magnetic material, and may be formed as a substantially continuous layer (e.g., continuous or nearly continuous), a screen, a metal foam, a layer of electrically conductive ink, or the like on a surface of the component 22 or 42.

The EMI shield may be configured to generate an output in response to an input (e.g., a magnetic field) applied by controller 20. The output generated by the EMI shield may remain substantially constant over time, unless the EMI shield is damaged, e.g., physically damaged during a tamper event in which an adversary may attempt to view component 22. In this way, the EMI shield may be configured to provide an output indicative of a health (e.g., tamper or no-tamper) condition of component 22 or 42. Controller 20 or 40 may periodically apply the input to the EMI shield and determine a health state of component 22 or 42, respectively, based on the output generated by the EMI shield in response to the applied input. In response to determining the output generated by the EMI shield substantially matches a stored output (e.g., stored by memory 26 or 46 or another memory), controller 20 or 40 may determine that the EMI shield is substantially intact. In response to determining the output generated by the EMI shield does not substantially match a stored output (e.g., stored by memory 26 or 46 or another memory), controller 20 or 40 may determine that the EMI shield has been tampered with. In response, controller 20, 40 may take a responsive action, such as deleting data stored by memory 26, generating an indication, or both.

Figure 2:
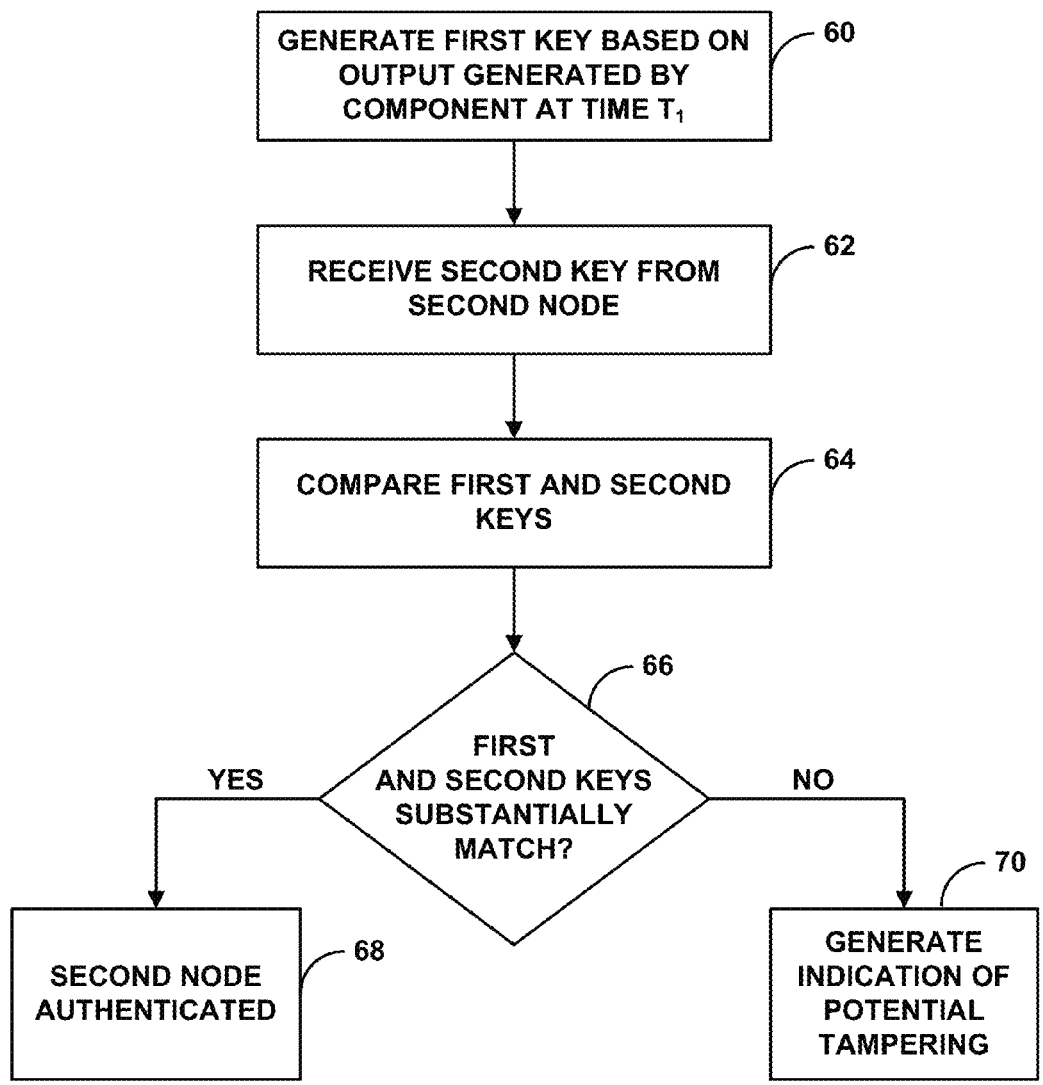
FIG. 2 is a flow diagram of an example technique that may be implemented by a node to authenticate another node.

FIG. 2 is a flow diagram of an example technique for authenticating a node based on a physics-based key. While the technique shown in FIG. 2 is described with respect to first node 12 authenticating second node 14, in other examples, first node 12 may authenticate another node using the technique shown in FIG. 2, or second node 14 or another node of system 10 may implement the technique shown in FIG. 2 to authenticate first node 12 or another node. In some examples, the technique shown in FIG. 2 may be implemented by first node 12 prior to, for example, transmitting data to second node 14, receiving data from second node 14, or both.

In the technique shown in FIG. 2, controller 20 generates a first key based on an output generated by component 22 at time $T_1$ (60). Controller 20 may also receive a second key from second node 14 (62), where the second key is generated by controller 40 of second node 14 based on an output generated by component 42 of second node 14 at time $T_2$. Times time $T_1$ and $T_2$ are substantially the same (e.g., the same or nearly the same) in some examples, such that the first and second keys are time-matched. Controllers 20, 40 may be configured, e.g., based on the synchronization of clocks 24, 44, to generate the respective first and second keys based on outputs generated by components 22, 42 at substantially the same time. In some examples, controllers 20, 40 are configured to generate the respective first and second keys at predetermined times, such as at a predetermined frequency.

In some examples, controller 20 requests the second key from second node 14. Controller 20 may request the second key from second node 14 using any suitable technique, such as by controlling communication module 28 to transmit a request (e.g., a signal) for a key to node 14 via communications channel 16. In response to receiving the request via communications module 48, controller 40 may transmit the second key to first node 12 via communications channel 16.

In other examples, rather than requesting the second key from second node 14, controller 40 of second node 14 may be configured to automatically transmit the second key to second node 14 at the predetermined times, such as at predetermined intervals, which may coincide with predetermined time intervals at which controllers 20, 40 generate keys. Likewise, in some examples, controller 20 of first node 12 may be configured to automatically transmit the first key to first node 12 at the predetermined times, such as at predetermined intervals, which may coincide with predetermined time intervals at which controllers 20, 40 generate keys. In some examples, a particular time interval may be associated with the most recent (in time) set of time-matched keys generated by nodes 12, 14. Communications received by node 12 during a particular time interval may then be authenticated based on the physics-based keys associated with the time interval.

The order of blocks shown in FIG. 2 may, though need not always, impart an order to the technique. For example, in some examples, controller 20 may receive the second key from second node 14 (62) at substantially the same time as or prior to generating the first key (60).

Controller 20 may compare the time-matched first and second keys (64). Controller 20 may compare the time-matched first and second keys to authenticate a communication from node 12 (e.g., a packet) that is sent or received within a time period associated with the keys. For example, controller 20 may be configured such that the first and second keys may only be valid for authenticating a message received within a predetermined time window starting from time $T_1$ at which component 22 generated the output with which controller 20 generated the first key. The predetermined time window may have a duration that is based on, for example, the period of time that controller 20 stores the first key. As discussed above, such a period of time may be predetermined and selected based on, for example, the expected transmission time of a message from node 14 to node 12.

Controller 20 may determine whether the first and second keys substantially match using any suitable technique. In one example, for each of the first and second keys, controller 20 identifies the bits in a sequence (e.g., a sequence of 512 bits) that is being used as the key and compares the keys on a bit-by-bit basis. Controller 20 can determine the keys match in response to determining each bit of the first key matches a corresponding bit of the second key, or a threshold percentage (e.g., 95% or greater) of bits of the first and second keys match. In other examples, controller 20 may compare the keys using an algorithmic function and values derived from bit streams of the first and second keys. Controller 20 may, for example, determine the first and second keys match in response to determining the outputs of the algorithmic function (to which the values derived from the bit streams of the first and second keys were inputs) substantially match (e.g., matches or is within a threshold range of each other, such as 1% of each other).

In response to determining the first and second keys substantially match ("YES" branch of block 66), controller 20 may authenticate second node 14 (66). On the other hand, in response to determining the first and second keys do not substantially match ("NO" branch of block 66), controller 20 may generate an indication (70). The indication may indicate, for example, indication that there was a potential tampering with node 12, node 14, or that the communication between nodes 12, 14 was compromised. In some examples, the indication may be a flag, value, or other indication stored by memory 26 of node 12, a notification (e.g., signal) transmitted to another device in communication with node 12, or both.

Controller 20 may be configured to concurrently any number of keys, e.g., to authenticate more than one other node of system 10 at substantially the same time.

FIGS. 1 and 2, as well as other description herein, may refer to the generation of a key based on the output of component 22 or 42. The "output" of the component 22, 42 with which controllers 20, 40, respectively, generate the respective keys may include a plurality of outputs generated over a period of time.

In addition to, or instead of, authenticating another node or message received from another node using time-matched keys, controllers 20, 40 may each encrypt or decrypt data using time-matched keys or another key. For example, controller 20 may encrypt data using a first key generated based on an output of component 22, and control communications module 28 to transmit the data to node 14. Controller 40 may receive the encrypted data from node 12 via communications module 48. Controller 40 may decrypt the data using a second key that is time-matched to the first key. In some examples in which controllers 20, 40 generate keys at predetermined time intervals based on outputs of components 22, 42 generated at the predetermined time intervals, a particular time interval may be associated with the most recent (in time) set of time-matched keys generated by nodes 12, 14. Communications received by node 12 during a particular time interval may then be decrypted based on the physics-based keys associated with the time interval, communications transmitted by node 12 to node 14 during a particular time interval may then be encrypted based on the physics-based keys associated with the time interval, or both.

Figure 3:
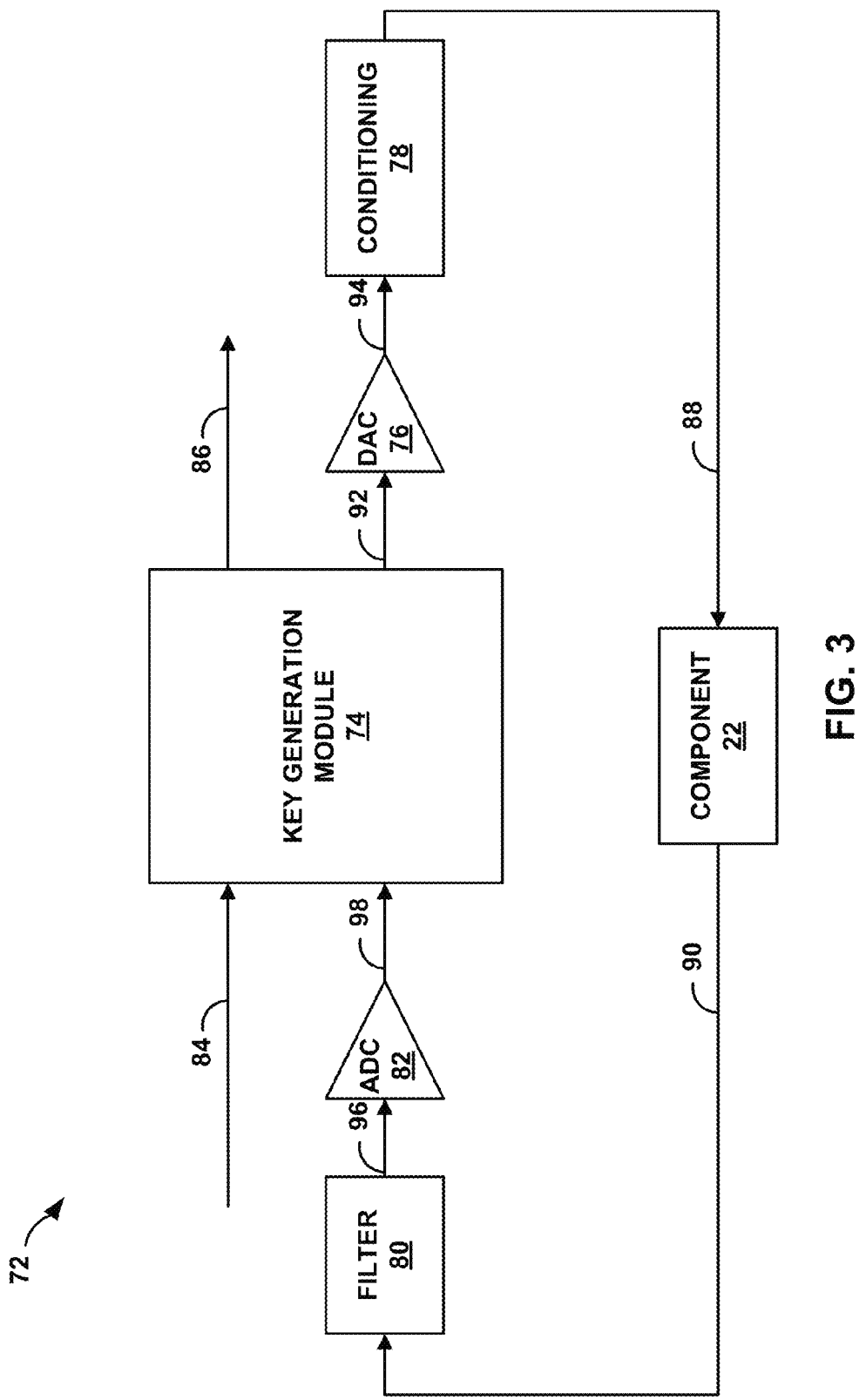
FIG. 3 is a block diagram illustrating an example circuit for generating an example physics-based key.

FIG. 3 is a functional block diagram illustrating an example circuit 72 configured to generate a key based on a physics-based output of a component. For ease of description, circuit 72 is described with respect to controller 20 of first node 12 and elements of first node 12. In other examples, another node, such as second node 14, may include circuit 72 in addition to or instead of first node 12.

In the example shown in FIG. 3, circuit 72 includes component 22, key generation module 74, digital-to-analog converter (DAC) 76, conditioning circuit 78, filter 80, and analog-to-digital converter (ADC) 82. In some examples, controller 20 may include some or all of the elements of circuit 72, such as, but not limited to, generation module 74, DAC 76, conditioning circuit 78, filter 80, and ADC 82. Key generation module 74 is configured to receive input 84 and generate, as an output, key 86. Key 86 may, for example, authenticate another node, authenticate trust of node 12 to another node, authenticate a message received from another node, encrypt or decrypt data, or any combination thereof.

Key generation module 74 may be implemented by hardware, software, firmware or any combination thereof. In the example shown in FIG. 3, key generation module 74 is configured to transform input 98, which is based on output 90 generated by component 22, to generate key 86. Key generation module 74 may implement any suitable transformation algorithm (e.g., a transformation function) that results in a unique value. The transformation algorithm can be selected such that there is one-to-one mapping of input value (e.g., input 98) to output value (e.g., key 86), and such that there is no aliasing (e.g., such that two or more input values do not result in the same output value). In some examples, the transformation algorithm is non-linear, and in these examples, no proportional relationship exists between the value input to the transformation algorithm and the value output from the algorithm. Using these parameters and other parameters, the selected transformation algorithm may be selected such that it is resistant to linear and differential cryptanalysis, as well as algebraic attacks.

An example of a non-linear transformation algorithm that key generation module 74 may implement to transform key 86 includes a Substitution-box (also referred to as an "S-box"), which performs substitutions between an input and an output. In some examples, the Substitution-box is a look-up table that associates an input 98 with a transformed value, which may then be used as key 86. Instead of, or in addition to, the Substitution-box, in some examples, key generation module 74 may transform input 98 using an independent cryptographic algorithm, such as using AES, RC5, or DES algorithms, or any combination thereof. However, the transformation algorithm implemented by key generation module 74 to transform a unique input 98 to a transformed value is not necessarily cryptographic in all examples.

Key generation module 74 is configured to output a transformed value, which results when the unique input 98 based on a particular output 90 of component 22 undergoes the transformation. In some examples, the transformed value output by key generation module 74 is key 86, which may be used for authentication, encryption/decryption, or both. In some examples, the transformed value is combined with a master key using any suitable combination function (e.g., a bitwise XOR function, non-linear function, a hash function, a cryptographic function, a look-up table, and the like), and the result of this combination is used by controller 20 as the key.

In examples in which the output of component 22 varies over time, controller 20 implements a different function to generate key 86, depending on the time at which the output 90 used by key generation module 74 to generate key 86 is generated by component 22. Because the output of component 22 changes over time, even if one key is cracked and a master key (if used by key generation module 74 to generate the key) is determined, key generation module 74 implements different input values 90 to generate the key based on the time at which the key is generated. Accordingly, even if an adversary gains knowledge of a particular key, the key may be outdated in a matter of time (e.g., on the order of seconds), such the adversary may not use the key to tamper with system 10 or gain access to information of node 12 or another node of system 10. For at least these reasons, a key that is generated based on the output of a physics-based output of component 22 that changes over time may provide a cryptographically secure authentication or encryption technique.

In the example shown in FIG. 3, input 84 to key generation module 74 may be, for example, a signal from controller 20 that causes key generation module 74 to generate key 86 based on an output 90 of component 22 at the time the input signal 84 is received. In addition or instead, input 84 to key generation module 74 may be a clock signal generated by clock 24. Key generation module 74 may be configured to generate key 86 based on the output 90 generated by component 22 at a particular time indicated by the clock signal.

In some examples, component 22 is configured to generate an output 90 in response to an input 88. Input 88 may be, for example, a stimulus applied to component 22, e.g., by conditioning circuit 78, power applied to component 22, or another input signal that may evoke a detectable output from component 22. In addition, or instead, in some examples in which component 22 includes a plurality of subcomponents configured to generate output 90 individually or collectively, input 88 received by component 22 may be a signal that indicates which subcomponents of component 22 are selected to generate the output 90. Component 22 may be configured such that a subset of the subcomponent is selectable to generate output 90 with which key generation module 74 generates a key. An example of a component with a plurality of selectable subcomponents is described in further detail below with respect to FIG. 5.

In the example shown in FIG. 3, key generation module 74 is configured to transmit data on DAC control bus 92; DAC 76 is configured to convert the data to analog output signal 94. Analog output signal 94 may be used to drive conditioning circuit 78. Conditioning circuit 78 is configured to generate input 88 to component 22, where input 88 may drive the generation of output by component 22. In some examples, conditioning circuit 78 includes a mechanical device (e.g., a vibrator), electrical device, optical device, or another device configured to generate a stimulus signal, which is provided as input 88 to component 22. The stimulus signal may drive component 22 to generate output 90.

Different components 22, even if they original from the same lot, may react differently to different inputs 88, and, therefore, generate different outputs in response to the same input 88. Controller 20 may modify the output of component 22 at least modifying input 88 applied to the component 90 to evoke the physics-based output 90. Thus, in some examples, component 22 of node 12 and component 42 of second node 14 may generate substantially similar physics-based outputs, but may generate the particular output in response to different inputs (e.g., stimuli).

An output of a particular component 22 may also be modified by modifying the physical configuration of component 22. Any of the techniques described above for modifying the physics-based output of a particular component 106, e.g., in order to match the output to the output of another component 106, may be used alone or in combination with each other.

In the example shown in FIG. 3, component 22 is configured to generate an analog output 90, which may be, for example, a waveform or a particle. Filter 90 is configured to receive analog output 90 from component 22 and perform a filtering operation on component output 90 in order to generate filter output 96. Filter 90 may, for example, be configured to reduce background noise present in the output 90. In some examples, filter 90 may be a band-pass filter, a low-pass filter, a high-pass filter, a band-stop filter, a notch filter, a comb filter, or another suitable filter. The configuration of filter 90 may be selected based on the noise expected to be present in the output from component 20 or other suitable parameters.

Filter output 96 may be, for example, an analog signal that is input to ADC 82 to generate digital output signal 98. Key generation module 74 is configured to receive digital output signal 98 from ADC 82 and generates key 86 based on digital output signal 98, which is indicative of a physics-based output generated by component 20 at a particular time. From the information in digital output signal 98, key generation module 74 may generate a physics-based key.

In some examples, controller 20 (e.g., key generation module 74 of controller 20) may implement control algorithms such that circuit 72 may only be accessed through input data 84 and output data 86 using software or hardware that follows secure protocols. In some examples, key generation module 74 may be configured to implement functional modules that perform processing steps on incoming and outgoing data. The modules may include, for example, security modules that configure key generation module 74 to implement security features, such as hash functions or encryption functions on input data 84 and output data 86. For example, key generation module 74 may incorporate or append AES data to messages on output data 86 to increase the security of data transmitted by key generation module 74. In addition, or instead, key generation module 74 may be configured to generate a key 86 based on input 84 that includes AES data. In some examples in which portions of the security modules of key generation module 74 are implemented in software code, the software code may be periodically updated to increase the difficulty with which an adversary may defeat the security measures. The software code implemented by key generation module 74 may also make it more difficult for an adversary to determine the functions of hardware components of circuit 72.

The configuration of circuit 72 may help improve the security of physics-based key generation by node 12. For example, embedding component 22 into a control loop of circuit 72 may help increase the difficulty with which an adversary may determine the relationship between input data 84 and key 86 generated by circuit 72. As an example, configuring key generation module 74 such that input data 84 is mapped to control data 92 in a non-deterministic fashion may help decrease the possibility that an adversary may determine the relationship between input data 82 and output data 86 by simulating controller 22 and circuit 72 by determining the output 90 of component 22 generated in response to a number of input signals 84 to circuit 72. In some examples, key generation module 74 is configured such that input data 84 is mapped to control data 92 in a non-deterministic fashion by being configured to has or otherwise transform input data 84 to generate control data 82 that DAC 76 converts to analog output signal 94 to drive conditioning circuit 78. The transformation of analog output signal 94 by conditioning circuit 78 to a mechanical, electrical, optical, or other type of stimulus signal 88 for component 22 may also help obfuscate the conversion of input data 84 to physics-based output 90 of component 22.

In some examples, conditioning circuit 78 may be configured, e.g., during a manufacturing process, to enable matching of physics-based output 90 of component 22 to a physics-based output of component 42 of node 14 or a component of another node of system 10. In this way, the components 22, 42 may be configured, via respective conditioning circuits, to be a matched pair of components that are configured to generate substantially matching physics-based outputs.

In addition, or instead, filter 80 may be configured (e.g., tuned) to modify physics-based output 90 of component 22 to a physics-based output of component 42 or another component. The application of filter 80 and, in some examples, additional processing, to physics-based output 90 of component 22 may help controller 20 generate a substantially similar key as second node 14, even if components 22, 42 are configured to generate different physics-based outputs.

Modifying physics-based output of component 22 with which key generation module 74 generates a key, e.g., by modifying configurations of filter 80, conditioning circuit 78, or both, may make it more difficult for an adversary to copy the operation of component 22 in a counterfeit device. For example, including transformative processes upon data within circuit 72 may make it more difficult for an adversary to obtain information about the physical characteristics of component from physics-based output 90 and key 86.

Key generation module 74, component 22, and other elements of circuit 72 may be configured such that an attempt by an adversary to probe circuit 72 may alter (e.g., by physically damaging) one or more of elements of circuit 72. For example, some of the elements of circuit 72 (e.g., filter 80 or conditioning circuit 78) may be located on the same integrated circuit as component 22 and near component 22, such that it may be more difficult for an adversary to probe component or another element of circuit 72 without altering the performance of one of the components of circuit 12. The physical or electrical alteration to one or more elements of circuit 72 may modify key 86 generated by key generation module 74, e.g., by modifying input 88 to component 22 or output 90 from component 22. As a result of the tampering with circuit 72, key generation module 74 may no longer be configured to generate a key that substantially matches a counterpart circuit of second node 14 or another node with which node 12 may attempt to securely communicate. In this way, tampering with circuit 72 that causes output 86 of circuit 72 to be altered may help restrict the ability of an adversary to obtain useful information from circuit 72.

In other examples, circuit 72 configured to generate a key based on a physics-based output of component 22 may have another configuration. For example, component 22 may be configured to generate a digital output, such that circuit 72 may not include ADC 82 in some examples. As another example, in the example shown in FIG. 3, key generation module 74 is configured to control component 22 via DAC control bus 92. However, other configurations may also be used instead of or in addition to bus 92.

In some examples, key generation module 74 is functionally integrated with controller 20. For example, key generation module 74 and controller 20 may be provided by the same hardware. In other examples, key generation module 74 and controller 20 may be separate modules, e.g., may correspond to individual hardware units, such as ASICs, DSPs, FPGAs, or other hardware units, or one or more common hardware units.

Figure 4:
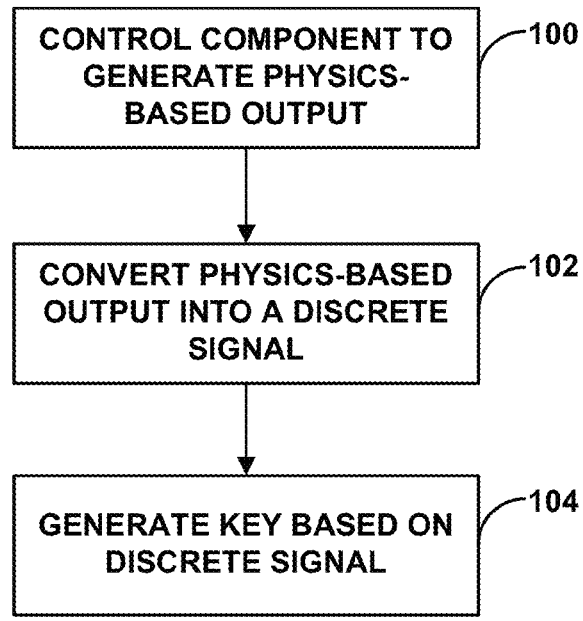
FIG. 4 is a flow diagram of an example technique that may be implemented to generate a key based on a physics-based output of a component that varies over time.

FIG. 4 is a flow diagram of an example technique that a controller may implement in order to generate a key based on a physics-based output of a component. The key may be, for example, any one or more of an authentication key, an encryption key, or a key used for another function. While the technique shown in FIG. 4 is described with respect to first node 12 and circuit 72 (FIG. 3), in other examples, second node 14 or another node of system 10 may implement the technique shown in FIG. 4 to generate a key based on a physics-based output of a component. Second node 14 may, for example, include circuit 72 or a similar circuit configured to generate a key based on a physics-based output of component 42.

In the example technique shown in FIG. 4, controller 20 controls component 22 to generate a physics-based output (100). For example, controller 20 may generate input signal 84 that is received by key generation module 74. In response to receiving the input signal, key generation module 74 may control component 22 to generate physics-based output 90 by, for example, causing an input 88 (e.g., a stimulus) to be applied to or otherwise provided to component 22. As discussed above with respect to FIG. 3, in some examples, key generation module 74 may generate a digital output to DAC control bus 92, which converts the output to an analog signal 94 that is received by conditioning circuit 78. Conditioning circuit 78 may then condition the analog signal 94 and generate signal 88 that is received by component 22 as an input. Signal 88 may be, for example, a stimulus that is applied to component 22 either electrically or mechanically. In response to receiving signal 88, component 22 may generate physics-based output 90, which is a function of the physical configuration of component 22. Physics-based output 90 may be, for example, a waveform or a particle.

In some examples, such as examples in which physics-based output 90 generated by component 22 is an analog signal, controller 20 may convert physics-based output 90 into a discrete signal (102). For example, with the aid of circuit 72, controller 20 may apply filter 80 to physics-based output 90 and convert the filtered signal 96 into a digital signal 98 with the aid of ADC 82. Controller 20 may then generate a key (e.g., an authentication key or an encryption/decryption key, or both), based on the discrete signal (104). For example, under the control of controller 20, key generation module 74 may transform input 98 (FIG. 3), which is based on output 90 (FIG. 3) generated by component 22, to generate key 86 (FIG. 3). Key generation module 74 may implement any suitable transformation algorithm (e.g., a transformation function) that results in a unique value.

FIG. 5 is conceptual illustration of an example component 106 that includes a plurality of subcomponents 108A-108N (collectively referred to as "subcomponents 108). Component 106 may include any suitable number of subcomponents 108 (e.g., less than ten, on the order of tens or hundreds). In some examples, one or both nodes 12, 14 may include component 106 and generate a key based on the physics-based output of the respective component 106. Thus, in some examples, component 106 shown in FIG. 5 may be an example of component 22 (FIG. 1) of node 12, an example of component 42 (FIG. 1) of node 14, or both. While component 106 is described with respect to node 12, in other examples, node 14 or another node of system 10 may include component 106.

Subcomponents 108 may each be configured to generate a physics-based output. Subcomponents 108 may have any suitable arrangement relative to each other, and, in some examples, may be arranged in an array. In some examples, controller 20 is configured to generate a key based on the physics-based output generated by a single subcomponent 108. In addition, or instead, in some examples, a plurality of subcomponents 108 (e.g., a subset of subcomponents 108 or all of subcomponents 108) may generate physics-based outputs that are combined to generate a physics-based output of component 106 with which controller 20 may generate a key.

Subcomponents 108 may have any suitable configuration. In some examples, at least one subcomponent 108 (e.g., one subcomponent 108 or all subcomponents 108) may be, for example, a cantilevered beam (e.g., a micro-cantilevered beam).

In some examples, due to the physical characteristics of each subcomponent 108, at least two subcomponents 108 are configured to generate different outputs (e.g., a unique analog output) than each other. The output may be unique to the particular subcomponent. Thus, a physics-based output of component 106 may be adjusted based on the particular subcomponents 108 that are selected to generate the output. As an example, component 108A may generate a first physics-based output, component 108B may generate a second physics-based output, and a combination of components 108A, 108B may generate a third physics-based output. In some examples, controller 20 may select the physics-based output with which the key is generated by selecting a subset of subcomponents 108 (e.g., activating a select subset of components 108) and generating the key based on the output from component 106 resulting from the subset of subcomponents 108.

The different combinations of subcomponents 108 that controller 20 may select may help further obfuscate the key generated by controller 20, e.g., by further complicating the path to determining the physics-based output of component 106 used by controller 20 to generate the physics-based key. Controller 20 may, for example, periodically select different combinations of subcomponents 108 to generate the output for generating the key. Because controllers 20, 40 are configured to generate time-matched keys, controller 40 of node 14 may likewise select different combinations of subcomponents of the respective component 42 when controller 20 selects a different combination of subcomponents 108 for generating a key.

In some examples, nodes 12, 14 may each include a respective component 106 (e.g., component 106 may be an example of component 22 and an example of component 42). The components 106 of each of the nodes 12, 14 may be fabricated in a common lot. For example, components 106 may each be a part of a respective integrated circuit that may be formed from a common wafer. Even if components 106 of each of the nodes 12, 14 are fabricated in the same lot, e.g., from the same wafer, during the same manufacturing process, and in the same manufacturing conditions, components 106 may have different physical characteristics. Even relatively minor differences in the physical characteristics of the components 106 may affect the physics-based output generated by the components 106. An authorized manufacturer of component 106 may adjust setup conditions for the manufacturing process to customize a fabricated lot of components 106 and increase the difficulty of creating counterfeit copies of components 106.

As discussed above, system 10 may be configured such that the output of components 106 of each of the nodes 12, 14 substantially match at substantially the same time, such that the respective controllers 20, 40 may authenticate the other node 14, 12, respectively, in response to determining the time-matched keys generated by the controllers 20, 40 substantially match. One or more different techniques may be implemented in order to achieve substantially similar physics-based outputs from different components 106. In some examples, controllers 20, 40 may activate different subsets of subcomponents 108 of the respective components 106 to generate substantially similar physics-based outputs. In this way, components 106 including selectable combinations of subcomponents 108 may be useful for substantially matching the output of a particular component 106 to another component 106, e.g., of a different node.

As discussed above with respect to FIG. 3, different components 106, even from the same lot, may react differently to different inputs, and, therefore, generate different outputs in response to the same input. Thus, the output of a particular component 106 (or component 22 or 42) may be modified by at least modifying the input (e.g., input 88 shown in FIG. 3) applied to the component 106 to evoke the physics-based output (e.g., output 90 shown in FIG. 3).

In some examples, the output of a particular component 106 may be modified by at least changing the physical characteristics of the component. For example, a coating or another material may be deposited on the component 106 or a subset of the subcomponents 108, where the coating may affect the output generated by the component. As another example, if subcomponents 108 each includes a cantilevered beam, the output of component 106 may be modified by modifying (e.g., trimming, such as by laser trimming) a length of one or more of the beams, by changing the way the beam moves (e.g., by depositing a glass on the beam), or any combination thereof. Modifying the length of a cantilevered beam may cause the particular subcomponent 108 to vibrate at a different frequency (compared to prior to the trimming the length of the beam), and, therefore, generate a different physics-based output.

Any of the techniques described above for modifying the physics-based output of a particular component 106, e.g., in order to match the output to the output of another component 106, may be used alone or in combination with each other. In addition, or instead, of modifying component 106 until it generates a particular physics-based output, controller 20 (or controller 40) may process the physics-based output generated by component 106, e.g., by application of a filter (e.g., filter 80 shown in FIG. 3), in order to generate a key that substantially matches a key generated by another node. In this way, two nodes 12, 14 may generate substantially matching keys based on different physics-based outputs of the respective components. The techniques herein may be used to customize a plurality of circuits 72 (FIG. 3) to generate substantially matching keys.

An understanding of component 106, and, if present, each of the subcomponents 108, may be desirable in order to modify component 106 (e.g., a particular subcomponent 108) to achieve a particular physics-based output that may be time-matched to a key generated by another node. Any suitable algorithm may be implemented in order to gain an understanding of the output of component 106 (or another component) and how it may change based on the input to component 106 or the physical configuration of component 106. For example, controller 20 (or another controller, e.g., of a device other than node 12) may control component 106 to generate a particular output, which may be stored in memory 26 as a sample output. The physics-based output of component 106 may then be modified using any one or more of the techniques described above.

Controller 20, alone or with the aid of a user, may then associate a particular modification to the physics-based output resulting from the particular modification in order to generate rules for how the physics-based output of component 106 changes relative to the sample output in response to each of a plurality of modifications. In this way, controller 20 may determine rules for the relationship between the physics-based output of component 106 and a particular modification (e.g., to the input signal, the physical characteristics of component 106, or the specific subcomponents 108 selected to generate the output). This predetermined relationship between the physics-based output and a particular modification may then inform the modifications that are made (e.g., by a user or automatically by controller 20) to the output of component 106 in order to generate a key that substantially time matched to a key generated by another node.

For example, in some examples in which component 106 comprises a plurality of cantilever beams, controller 20 may determine the physics-based output generated by a particular subcomponent 108A in response to a particular stimulus from a vibrational source. The output may be, for example, an electrical signal. Controller 20 may also determine the physics-based outputs of each of the other subcomponents 108 in response to substantially the same stimulus (e.g., the same or nearly the same stimulus). In addition, controller 20 may determine the physics-based output of a particular subcomponent 108 for a particular beam length, beam material, or both, such that the physical behavior of the cantilever beams may be determined for a plurality of physical configurations.

Using the rules that establish how the physics-based output of a particular component 106 changes relative to the sample output in response to each of a plurality of modifications, the output of component 106 may be time-matched to another component, e.g., of another node or to be used in another node.

Figure 6:
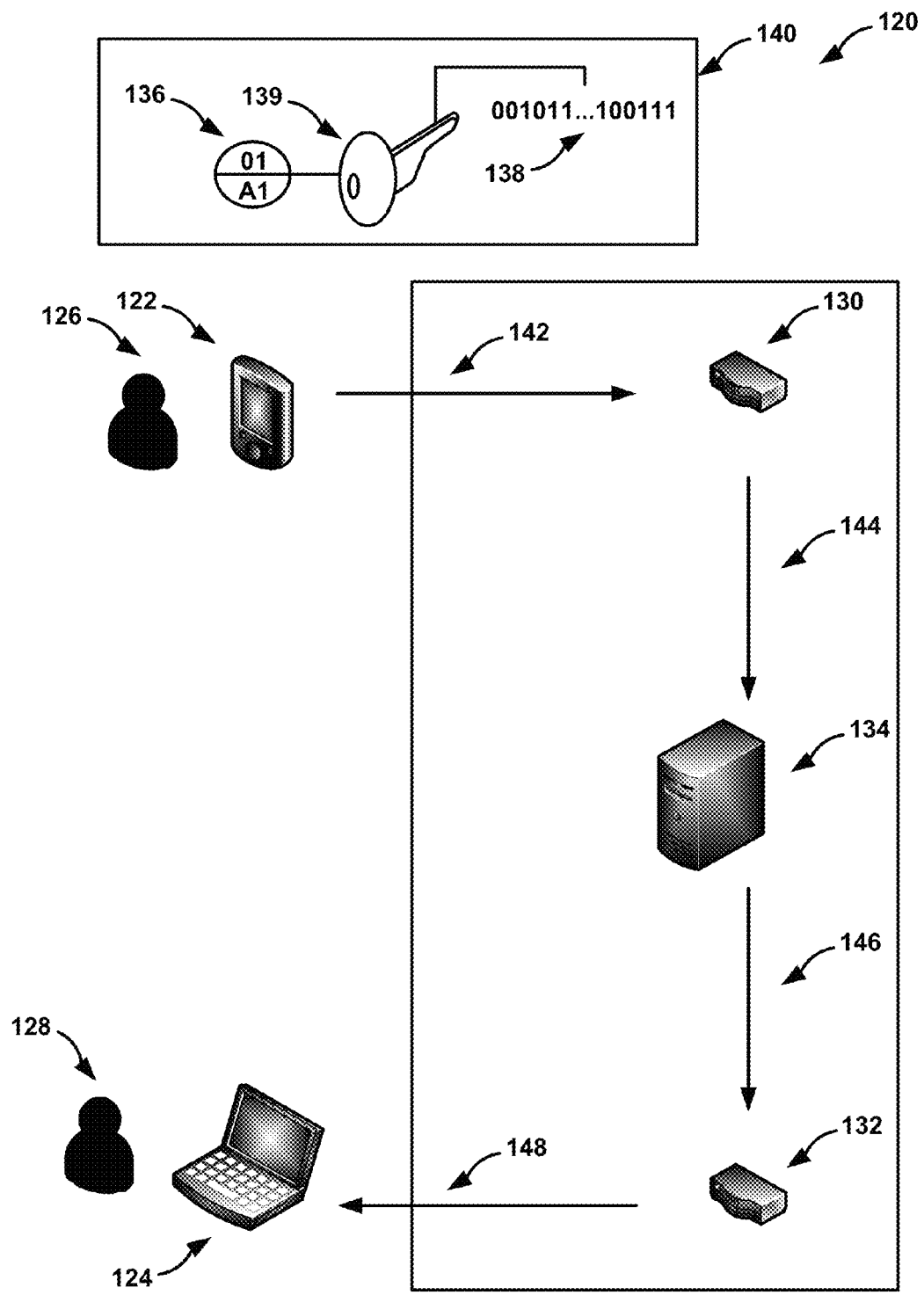
FIG. 6 is a conceptual diagram of a system that includes a handheld device configured to securely communicate with a remote computer using physics-based keys.

FIG. 6 is a conceptual diagram of another example system 120 that includes handheld device 122 configured to securely communicate with remote computer 124 using physics-based keys described herein. In the example shown in FIG. 6, user 126 is configured to interact with handheld device 122 and user 128 is configured to interact with remote computer. Handheld device 122 is configured to communicate with remote computer 124 with the aid of routers 130, 132 and server 134. Handheld device 122 and remote computer 124 may each be an example of a node 12 or 14 described with respect to FIG. 1. In some examples, at least one of router 130, router 132, or server 134 may also be an example of a node 12 or 14.

As shown in FIG. 6, a controller of handheld device 122 is configured to generate a first physics-based key 136 based an output generated by a component of handheld device 122 during a time period P1. The controller may, with the aid of a communications module of device 122, transmit first physics-based key 136 along with other data 138 to be communicated to remote computer 124. First physics-based key 136 may be part of information stream 140, which, in the example shown in FIG. 6, also includes data 138, which as been encrypted using any suitable technique, such as an AES algorithm 139 or using key 136. A controller of handheld device 122 may transmit information stream 140 to router 130 via local network 142.

In the example shown in FIG. 6, router 130 includes a component that is configured to generate an output (referred to as a "second output" for ease of description) during time period P1 that is substantially similar to the output generated by the first component of handheld device 122 during time period P1. A controller of router 130 may generate a key (referred to as "second key" for ease of description) based on the second output of the component of router 130. In this way, handheld device 122 and router 130 may be configured to generate time-matched keys. A controller of router 130 may receive the information stream 140 from handheld device 122, e.g., via a communications module of router 130, and the controller of router 130 may authenticate the stream 140 by at least confirming that the first and second keys substantially match. In response to determining the first and second keys do not substantially match, the controller of router 130 may take a responsive action, such as discarding information stream 140, generating a notification that is transmitted to remote computer 124 to indicate a potential security compromise, or any other suitable action.

In response to determining the first and second keys substantially match, the controller of router 130 may forward information stream 140 onto server 134 via link 144. If a controller of server 134 is configured to generate a time-matched key based on the output of a component of server 134, then server 134 may authenticate stream 140 by at least confirming that the key generated by server 134 substantially matches the second key. In response to determining the key generated by server 134 does not substantially match the first key 136 of stream 140, the controller of server 134 may take a responsive action, such as discarding information stream 140, generating a notification that is transmitted to remote computer 124 to indicate a potential security compromise, or any other suitable action.

In response to determining the key generated by server 134 substantially matches the first key of stream 140, the controller of server 134 may forward information stream 140 onto router 132 via link 146. In other examples, server 134 may be configured to pass information stream 140 onto router 132 without authenticating router 130. As part of local network 148, router 132 may include a controller and a third component, where the controller may be configured to generate a third key based on an physics-based output (referred to herein as a "third output" for ease of description) of the third component. The third component may be configured to generate the third output during the time period T1, where the third output that substantially matches the first output of the first component generated during time period T1. In this way, the controller of router 132 is configured to generate a key (referred to herein as a "third key" for ease of description) based on the physics-based output of the third component, where the third key is time matched to the first key.

Router 132 may receive the information stream 140 from server 134 and authenticate the stream by at least comparing the first key of stream 140 and the third key. In response to determining the first and third keys do not substantially match, the controller of router 132 may take a responsive action, such as discarding information stream 140, generating a notification that is transmitted to remote computer 124 to indicate a potential security compromise, or any other suitable action.

In response to determining the first and third keys substantially match, router 132 may forward information stream 140 to remote computer 124 via local area network 148. In the example shown in FIG. 6, remote computer 124 includes a component that is configured to generate an output (referred as a "fourth output" for ease of description) during time period P1 that is substantially similar to the output generated by the first component of handheld device 122 during time period P1. A controller of remote computer 124 may be configured to generate a key (referred to as "fourth key" for ease of description) based on the fourth output of the component of remote computer 124. In this way, handheld device 122 and remote computer 124 may be configured to generate time-matched keys. A controller of remote computer 124 may receive the information stream 140 from router 132, and the controller of remote computer 124 may authenticate the stream 140 by at least confirming that the first and fourth keys substantially match.

In another example of system 120, the controller of handheld device 122 may include more than one physics-based key generated by respective components of handheld device 122 in information stream 140. For example, two or more of router 130, server 134, router 132, or remote computer 124 may be configured to authenticate information stream 130 based on different physics-based keys. Thus, in some examples, router 130, server 134, router 132, or remote computer 124 may each be configured to generate different keys that are time-matched with handheld device 122.

The techniques of this disclosure may be implemented in a wide variety of computer devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The memory described herein that defines the physical memory addresses, which may be used as part of the described encryption, may also be realized in any of a wide variety of memory, including but not limited to, RAM, SDRAM, NVRAM, EEPROM, FLASH memory, dynamic RAM (DRAM), magnetic RAM (MRAM), or other types of memory.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples of the invention have been described. These and other examples are within the scope of the following claims.

What is claimed is:

1. A method comprising:
receiving an output generated by a first component of a first node at a first time, wherein the output is based on a physical configuration of the first component, and wherein outputs generated by the first component vary over time;
generating, with a controller of the first node, a key based on the first output;
receiving, by the first node, a second key from a second node, wherein the second key is generated by the second node based on an output generated by a second component of the second node, the output generated by the second component being based on a physical configuration of the second component, wherein a first clock of the first node and a second clock of the second node are synchronized such that the first and second nodes are configured to generate time-matched keys based on outputs of the first and second components, respectively;
comparing, with the controller of the first node, the first and second keys;
in response to determining the first and second keys match, authenticating the second node or a communication from the second node; and
in response to determining the first and second keys do not match, generating an indication indicative of potential tampering with the first node, the second node, or communication between the first and second nodes, or indicative of compromised communication between the first and second nodes.

2. The method of claim 1, further comprising:
generating, by a circuit of the first node, a waveform or particle from the output of the first component; and
converting the waveform or particle into a discrete signal, wherein generating the first key based on the output of the first component comprises generating the first key based on the discrete signal.

3. The method of claim 1, further comprising controlling a stimulus source to apply a stimulus to the first component to cause the first component to generate the output.

4. The method of claim 3, wherein the stimulus source comprises at least one of a mechanical device, an electrical device, or an optical device.

5. The method of claim 1, further comprising:
receiving data at a third time within a predetermined time window of the first time; and
decrypting the data with the first key.

6. The method of claim 1, further comprising encrypting data with the first key.

7. The method of claim 1, wherein the output generated by the first component at the first time comprises a first output, the method further comprising:
receiving a second output generated by the first component at a second time, wherein the second output is based on the physical configuration of the first component and is different than the first output; and
generating, with the controller, a third key based on the second output, wherein the third key is different than the first key.

8. The method of claim 7, further comprising:
controlling a first stimulus source to apply a stimulus to the first component to cause the first component to generate the first output; and
controlling the stimulus source to apply a second stimulus to the first component to cause the first component to generate the second output, wherein the first and second stimuli are different.

9. The method of claim 7, wherein the first component comprises a plurality of components, the method further comprising:
selecting, with the controller, a first subset of components of the plurality of components, wherein the first output is generated by the first subset of components; and
selecting, with the controller, a second subset of components of the plurality of components, wherein the second output is generated by the second subset of components.

10. A first node comprising:
a first component configured to generate an output, wherein the first component is a physical structure, wherein the output is based on a physical configuration of the first component, and wherein outputs generated by the first component vary over time;

a first clock; and a controller configured to generate a first key based on the output generated by the first component, receive a second key generated by a second node based on an output generated by a second component of the second node, the output generated by the second component being based on a physical configuration of the second component, wherein the first clock of the first node and a second clock of the second node are synchronized such that the first and second nodes are configured to generate time-matched keys based on outputs of the first and second components, respectively, wherein the controller is further configured to compare the first and second keys, and, in response to determining the first and second keys match, authenticate the second node or a communication from the second node and, in response to determining the first and second keys do not match, generating an indication indicative of potential tampering with the first node, the second node, or communication between the first and second nodes, or indicative of compromised communication between the first and second nodes.

11. The system of claim 10, wherein the output generated by the first component comprises a first output, wherein the first component is configured to generate a second output at a second time, the second output being different than the first output, and wherein the controller is configured to generate a third key based on the second output.

12. The system of claim 11, wherein the first component comprises a plurality of components, and wherein the controller is configured to select a first subset of components of the plurality of components, wherein the first subset of components is configured to generate the first output, and wherein the controller is configured to select a second subset of components of the plurality of components, wherein second subset of components is configured to generate the second output.

13. The system of claim 11, further comprising a stimulus source configured to apply a first stimulus to the first component to cause the first component to generate the first output and a second stimulus to the first component to cause the first component to generate the second output.

14. The system of claim 13, wherein the stimulus source comprises at least one of a mechanical device, an electrical device, or an optical device.

15. The system of claim 13, the first and second stimuli are different.

16. The system of claim 10, further comprising:
a circuit configured to generate a waveform or particle from the output of the first component; and
an analog to digital converter configured to convert the waveform or particle into a discrete signal, wherein the controller is configured to generate the first key based on the discrete signal.

17. The system of claim 10, further comprising:
the second node comprising:
the second component; and
a second controller configured to generate the second key based on the output generated by the second component and transmit the second key to the first node.

18. The system of claim 17, wherein the first controller is configured to provide an input to the first component, and the first component is configured to generate the output in response to receiving the first input, and wherein the first controller is configured to modify the input to substantially match the first key to the second key.

19. The system of claim 10, wherein the controller is configured to generate the first key based on the output at a first time, and wherein the controller is configured to at least one of encrypt data with the first key or decrypt data received within a predetermined time window of the first time data with the first key.

20. The system of claim 10, wherein the first component comprises a sensor, a sensor array, or a semiconductor device.

* * * * *